United States Patent
Hicklin et al.

(10) Patent No.: US 9,563,406 B1
(45) Date of Patent: Feb. 7, 2017

(54) GRAPHICAL USER INTERFACE REPLACEMENT OF FUNCTION SIGNATURES

(71) Applicant: The MathWorks, Inc., Natick, MA (US)

(72) Inventors: Joseph F. Hicklin, Upton, MA (US); Richard R. Goodenough, Billerica, MA (US)

(73) Assignee: The MathWorks, Inc., Natick, MA (US)

( * ) Notice: Subject to any disclaimer, the term of this patent is extended or adjusted under 35 U.S.C. 154(b) by 68 days.

(21) Appl. No.: 13/894,786

(22) Filed: May 15, 2013

(51) Int. Cl.
G06F 3/048 (2013.01)
G06F 9/44 (2006.01)

(52) U.S. Cl.
CPC ....................................... *G06F 8/34* (2013.01)

(58) Field of Classification Search
CPC ........ G06F 11/3688; G06F 8/33; G06F 8/437; G06F 8/34; G06F 8/20; G06F 8/38; G06F 8/70; G06F 9/4443; G06F 3/04883; G06F 3/041; G06Q 10/10
See application file for complete search history.

(56) References Cited

U.S. PATENT DOCUMENTS

| | | | | |
|---|---|---|---|---|
| 7,272,818 B2 * | 9/2007 | Ishimitsu | .............. | G06F 9/4443 715/763 |
| 8,060,822 B2 * | 11/2011 | Ishimitsu | .............. | G06F 9/4443 715/713 |
| 9,395,838 B2 * | 7/2016 | Yamaguchi | ........... | G06F 3/0481 |
| 9,418,183 B2 * | 8/2016 | Mahate | ............... | G06F 17/5009 |
| 2002/0016953 A1 * | 2/2002 | Sollich | .............. | 717/1 |
| 2002/0029377 A1 * | 3/2002 | Pavela | .......................... | 717/124 |
| 2002/0095657 A1 * | 7/2002 | Vaidyanathan | ........ | G06F 9/4446 717/110 |
| 2006/0267966 A1 * | 11/2006 | Grossman | ............. | G06F 3/0346 345/179 |
| 2008/0294406 A1 * | 11/2008 | Hachmeister | ................... | 703/11 |
| 2009/0313597 A1 * | 12/2009 | Rathbone | ................. | G06F 8/33 717/100 |
| 2010/0083225 A1 * | 4/2010 | Giat | ............................. | 717/111 |
| 2016/0154577 A1 * | 6/2016 | Lehtiniemi | ............. | G06F 3/041 715/716 |

OTHER PUBLICATIONS

W. Brown, GUIbuilder: GUI program development in MATLAB, Dec. 2012, 8 pages.*

* cited by examiner

*Primary Examiner* — Thuy Dao
(74) *Attorney, Agent, or Firm* — Harrity & Harrity, LLP

(57) ABSTRACT

A device may identify a function identifier input into a programming environment, and may determine an input argument associated with the function, based on the function identifier. The device may provide a user interface that depicts a representation of the input argument, and may provide, via the user interface, an input mechanism to be used to receive a value of the input argument. The device may receive, based on an interaction with the input mechanism, a value of the input argument. The device may provide information that indicates an association between the value and the input argument, based on receiving the value of the input argument.

21 Claims, 28 Drawing Sheets

```
TECHNICAL COMPUTING ENVIRONMENT
File   Edit   Tools   View   Execute   Help for i = 1:12
  im = textread('misc');
  if numel(im) > 122
    I = imread('cameraman.tif')
    imshow('cameraman.tif', [0 80]);
  end
end
```

FIG. 8I

GRAPHICAL USER INTERFACE REPLACEMENT OF FUNCTION SIGNATURES

BRIEF DESCRIPTION OF THE DRAWINGS

FIGS. 8A-8I are diagrams of another example implementation relating to the example process shown in FIG. 6.

DETAILED DESCRIPTION

The following detailed description of example implementations refers to the accompanying drawings. The same reference numbers in different drawings may identify the same or similar elements.

In computer programming, a function may refer to a sequence of program instructions that perform a specific task. The sequence of program instructions may be packaged together in the function, and the function may be called in program code, via a function call, whenever the specific task is to be performed. A function signature may define a name of the function, inputs to the function (e.g., a quantity of inputs, a name of the inputs, a data type of the inputs, etc.), outputs from the function (e.g., a quantity of outputs, a name of the outputs, a data type of the outputs, etc.), parameters of the function (e.g., an order of the inputs, a default value for the inputs, etc.), constraints of the function (e.g., requirements associated with the inputs), etc.

A developer may create a function by defining a function signature for the function, and a user may use the function in program code based on the defined function signature (e.g., by inputting a function call into the program code). However, designing, implementing, and using function signatures for program code can be difficult, time consuming, slow, and error prone. For example, a user may be required to have a deep understanding of the function signature (e.g., the number, order, data type, etc. of inputs, the function constraints, etc.) in order to use the function. This may constrain developers to creating simple functions that are easier to understand, but do not take full advantage of available computing power. Implementations described herein may simplify the creation and use of functions by providing a user-friendly graphical user interface for creating and using functions.

Figure 1A:
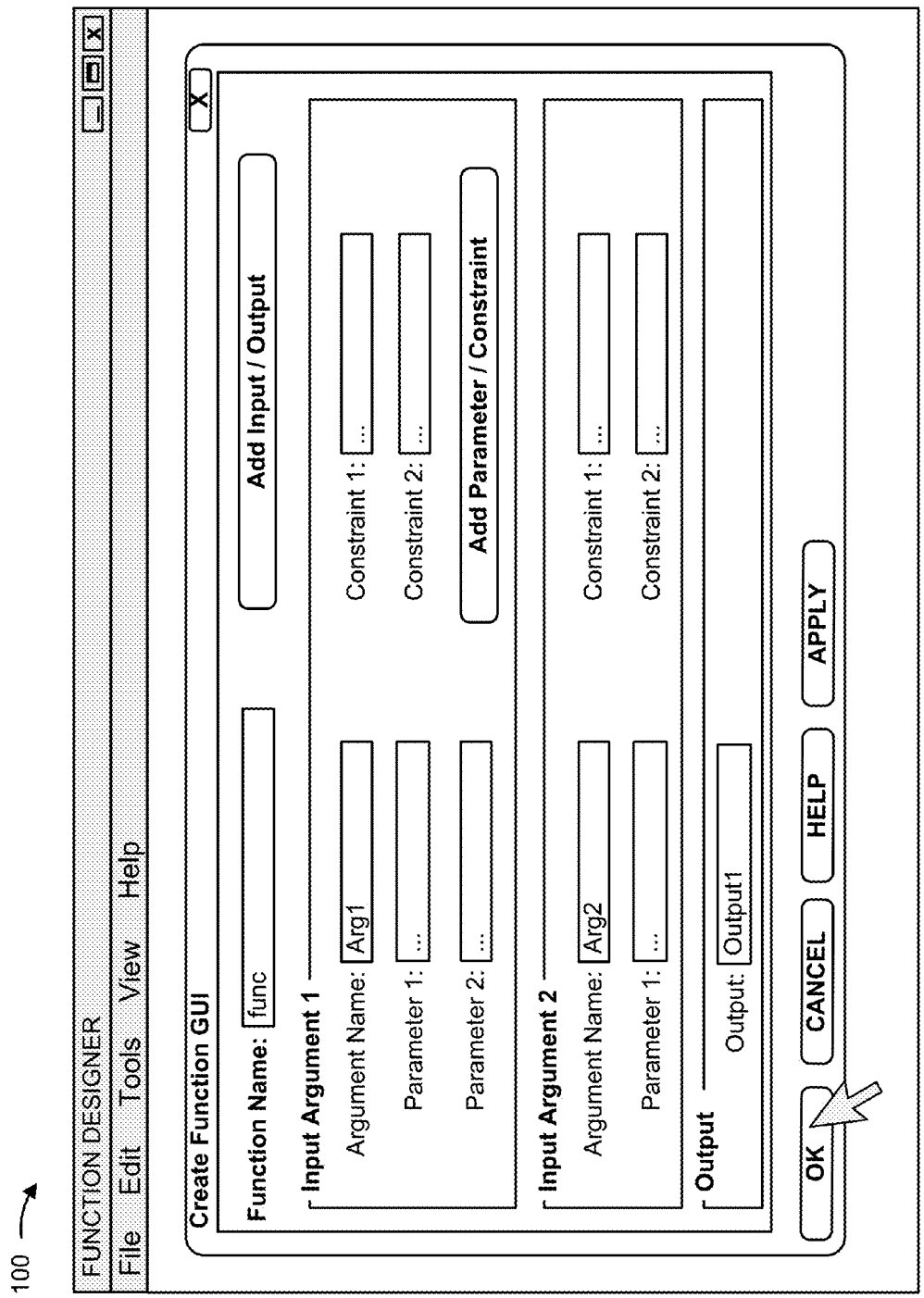
FIGS. 1A-1C are diagrams of an overview of an example implementation described herein.
Figure 1B:
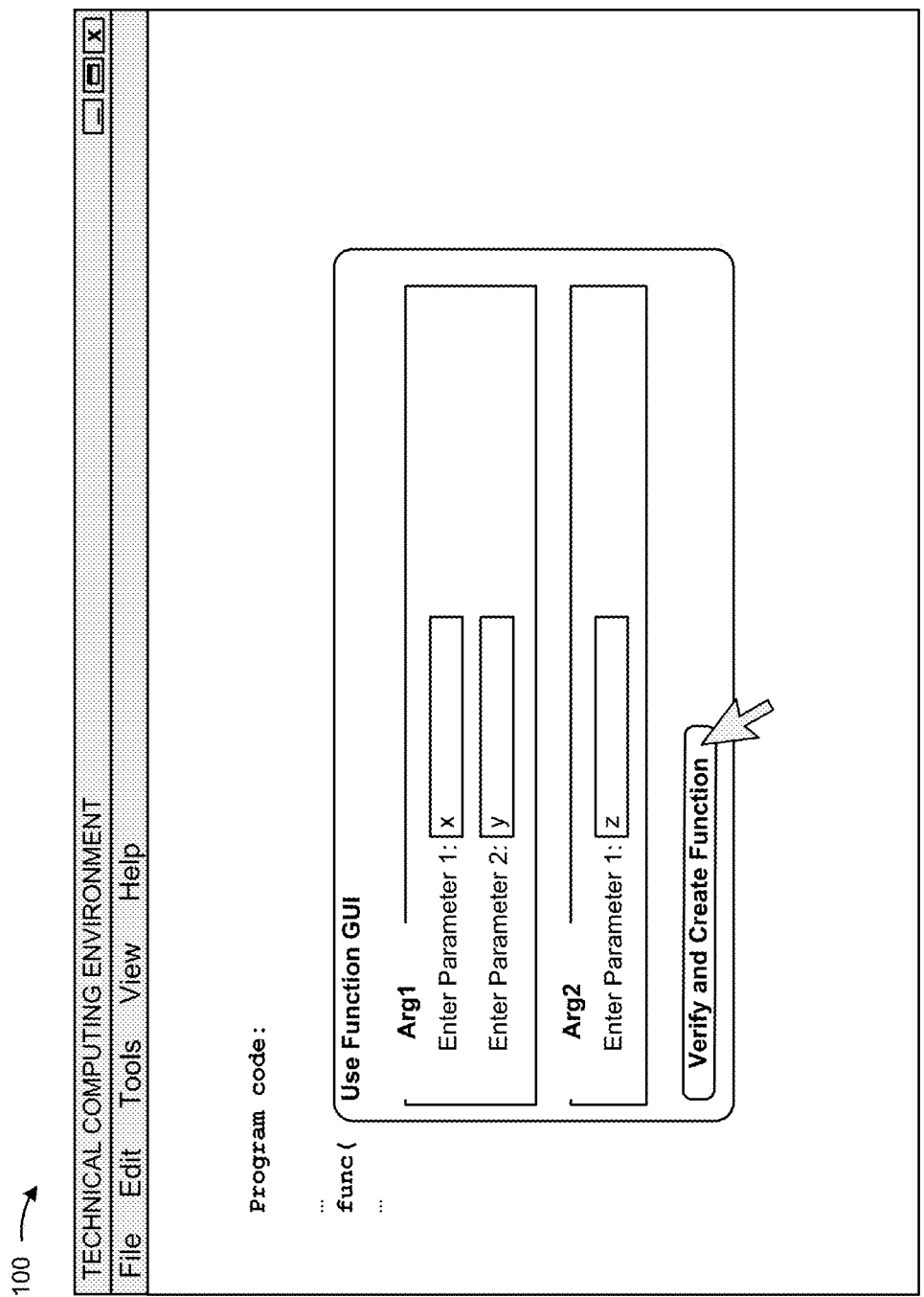
Figure 1C:
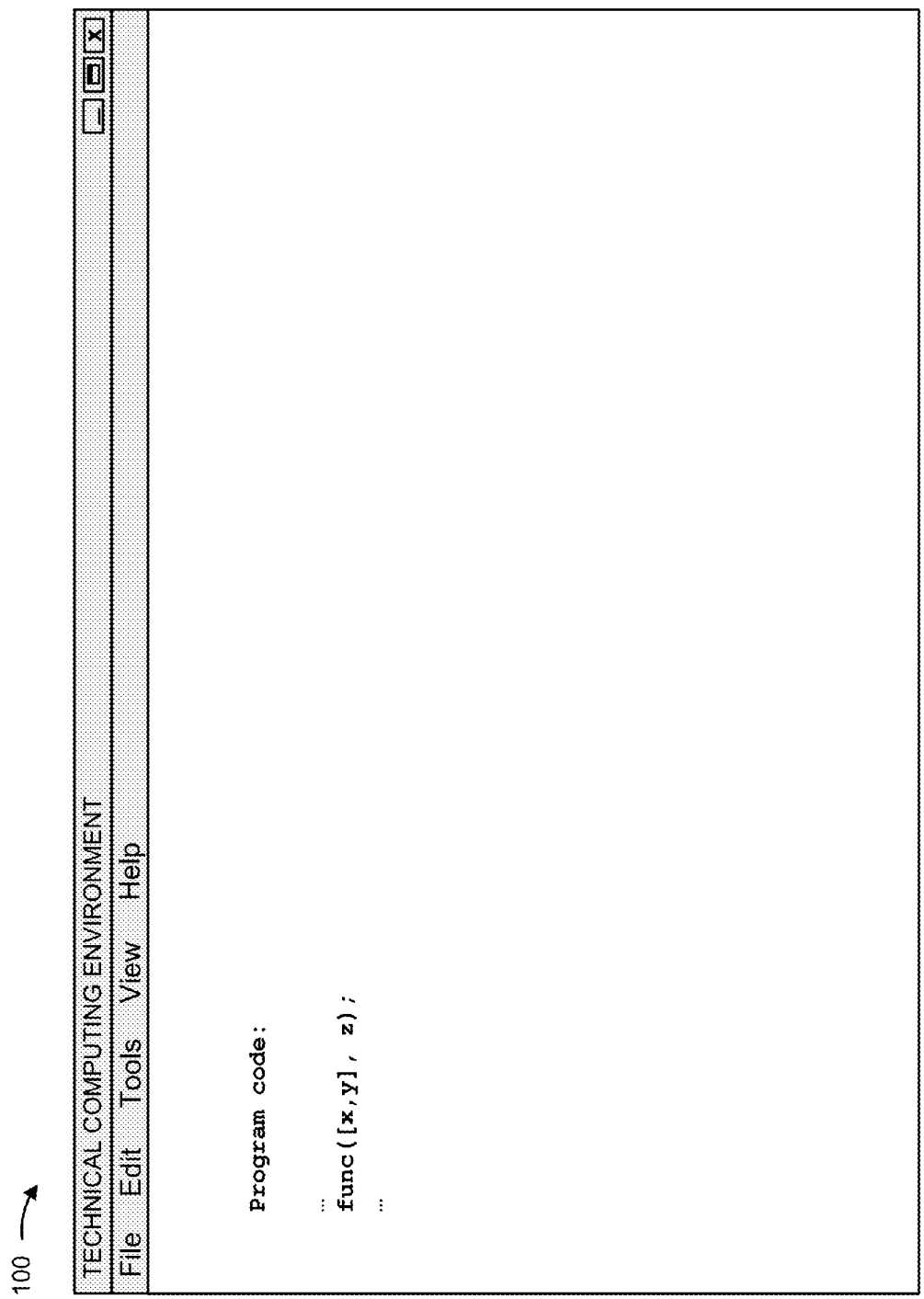

FIGS. 1A-1C are diagrams of an overview of an example implementation 100 described herein. As shown in FIG. 1A, a developer may use a graphical user interface (GUI) to create a function by defining a function signature. The developer may specify a name of the function, input arguments of the function, outputs of the function, parameters of the function, constraints of the function, etc. For example, the developer may specify "func" as a name of a function, may specify two input arguments of "Arg1" and "Arg2" for the function, and may specify a manner in which the input arguments are processed to generate an output identified as "Output1." The developer may also specify other information associated with the function, the inputs, and/or the outputs, such as parameters (e.g., a data type of the input arguments, potential values for the input arguments, etc.) and/or constraints (e.g., constraints on the values of the inputs arguments, constraints on a data type of the input arguments, etc.). In some implementations, the developer may specify GUI characteristics that define a manner in which a user is to interact with a GUI to use the function (e.g., a manner in which information is depicted on the GUI, an input mechanism for inputting information via the GUI, etc.).

As shown in FIG. 1B, a user may use the function, created by the developer, to create program code in a technical computing environment. For example, the user may type the name of the function, "func," into a text editor application, to begin to create a function call site. Typing the name of the function may cause a GUI to be provided that allows the user to input values associated with the function. In some implementations, the GUI may be provided based on GUI characteristics specified by the developer. The user may input values for input arguments and other function parameters via the user interface, based on the function signature created by the developer. For example, the user may enter a value of x and a value of y for first and second parameters of input argument Arg1, and may input a value of z for a parameter of input argument Arg2.

When the user is done entering values, the technical computing environment may verify the values, such as by determining whether the values satisfy constraints input by the developer. If the constraints are not satisfied, the GUI may guide the user in entering values that satisfy the constraints. If the constraints are satisfied, the technical computing environment may create a function call site (e.g., program code that causes the function to be called) based on the user inputs to the GUI. For example, as shown in FIG. 1C, the values of x, y, and z may be used to create the program code func([x, y], z). The user may continue to input program code, and may provide input that causes the technical computing environment to execute the program code. By creating and using functions in this manner, developers and users are relieved of many difficult tasks associated with creating and using functions, such as memorizing input arguments required for a function and verifying input argument values against function constraints.

Figure 2:
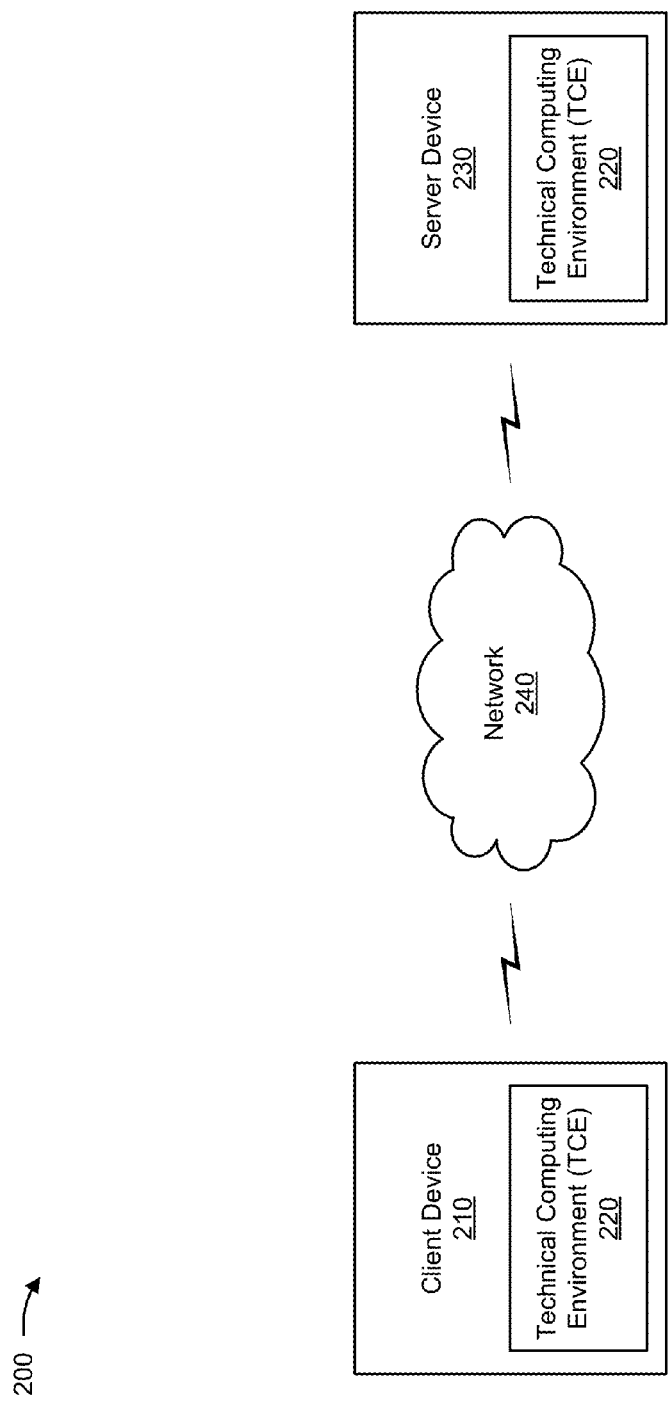
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, which may include a technical computing environment (TCE) 220. Furthermore, environment 200 may include a server device 230, which may include TCE 220, and a network 240. Devices of environment 200 may interconnect via wired connections, wireless connections, or a combination of wired and wireless connections.

Client device 210 may include a device capable of receiving, generating, storing, processing, executing, and/or providing program code and/or information associated with program code (e.g., a function and/or a function signature). For example, client device 210 may include a computing device (e.g., a desktop computer, a laptop computer, a tablet computer, a handheld computer, a server, etc.), a mobile phone (e.g., a smart phone, a radiotelephone, etc.), or a similar device. In some implementations, client device 210 may receive information from and/or transmit information to server device 230 (e.g., program code and/or information associated with program code, such as a function and/or a function signature).

Client device 210 may host TCE 220. TCE 220 may include any hardware-based logic or a combination of hardware and software-based logic that provides a computing environment that allows tasks to be performed (e.g., by users) related to disciplines, such as, but not limited to, mathematics, science, engineering, medicine, and business. TCE 220 may include a text-based environment (e.g., MATLAB® software), a graphically-based environment (e.g., Simulink® software, Stateflow® software, SimEvents® software, etc., by The MathWorks, Inc.; VisSim by Visual Solutions; LabView® by National Instruments; Agilent VEE by Agilent Technologies; Advanced Design System (ADS) by Agilent Technologies; Agilent Ptolemy by Agilent Technologies; etc.), or another type of environment, such as a hybrid environment that may include, for example, a text-based environment and a graphically-based environment.

TCE 220 may include, for example, a text environment (e.g., a text editor) and/or a graphical environment (e.g., a graphical user interface) that permits a user to input program code. The program code may include a function. A function, as used herein, is to be broadly interpreted to include a function, a method, a procedure, a subroutine, a subprogram, or a sequence of program instructions packaged together to perform a specific operation. The function may include an input argument on which the function is performed, and may generate an output (e.g., a return value) based on performing the function on the input argument. Additionally, or alternatively, an input argument may control a behavior of the function. TCE 220 may permit a developer to create a function by defining a function signature, and may permit a user to use the function created by the developer.

Server device 230 may include one or more devices capable of receiving, generating, storing, processing, executing, and/or providing program code and/or information associated with program code (e.g., a function and/or a function signature). For example, server device 230 may include a computing device, such as a server, a desktop computer, a laptop computer, a tablet computer, a handheld computer, or a similar device. In some implementations, server device 230 may host TCE 220.

Network 240 may include one or more wired and/or wireless networks. For example, network 240 may include a cellular network, a public land mobile network ("PLMN"), a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks.

The number of devices and/or networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
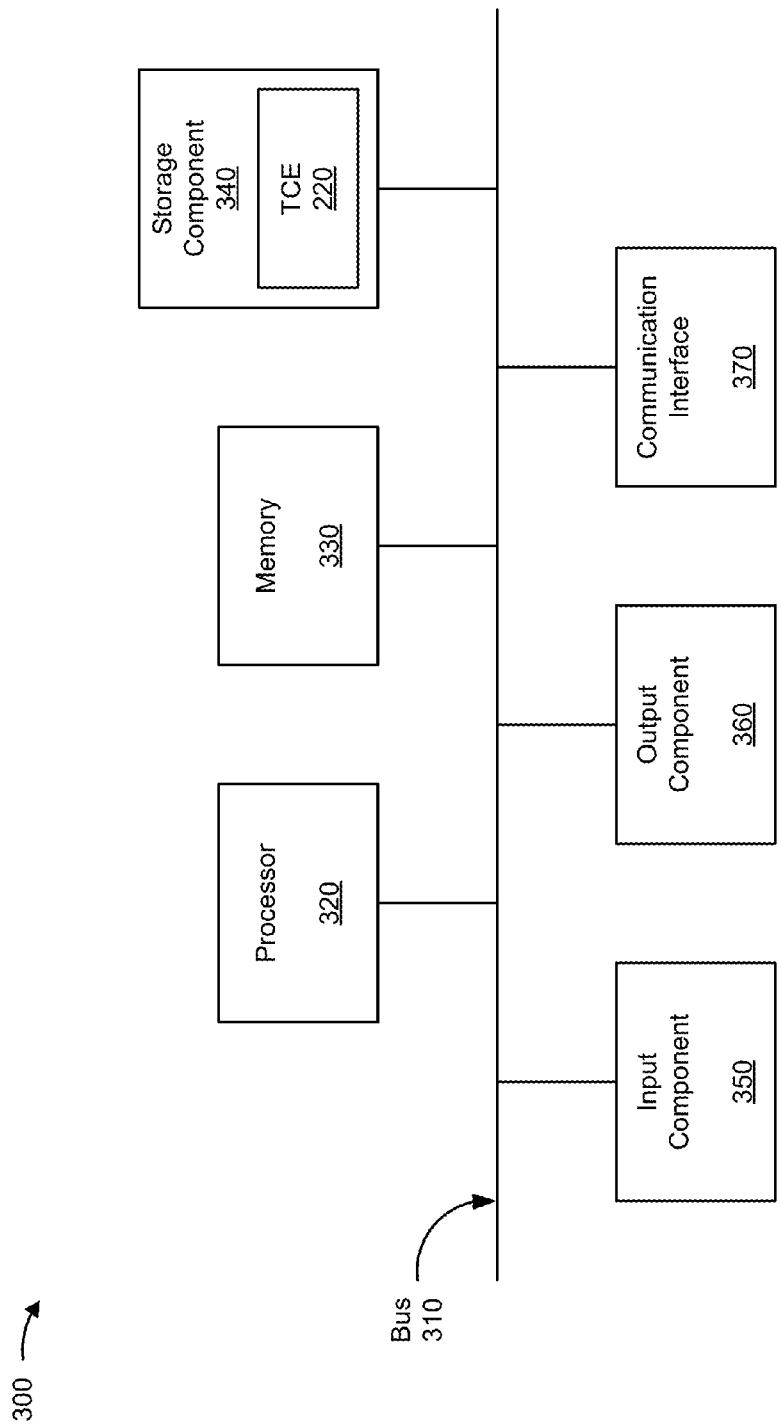
FIG. 3 is a diagram of example components of one or more devices of FIG. 2.

FIG. 3 is a diagram of example components of a device 300, which may correspond to client device 210 and/or server device 230. In some implementations, each of client device 210 and/or server device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a path that permits communication among the components of device 300. Processor 320 may include a processor (e.g., a central processing unit, a graphics processing unit, an accelerated processing unit, etc.), a microprocessor, and/or any processing logic (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage component (e.g., a flash, magnetic, or optical memory) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive. In some implementations, storage component 340 may store TCE 220.

Input component 350 may include a component that permits a user to input information to device 300 (e.g., a touch screen display, a keyboard, a keypad, a mouse, a button, a switch, etc.). Output component 360 may include a component that outputs information from device 300 (e.g., a display, a speaker, one or more light-emitting diodes (LEDs), etc.).

Communication interface 370 may include a transceiver-like component, such as a transceiver and/or a separate receiver and transmitter, that enables device 300 to communicate with other devices, such as via a wired connection, a wireless connection, or a combination of wired and wireless connections. For example, communication interface 370 may include an Ethernet interface, an optical interface, a coaxial interface, an infrared interface, a radio frequency (RF) interface, a universal serial bus (USB) interface, or the like.

Device 300 may perform various operations described herein. Device 300 may perform these operations in response to processor 320 executing software instructions included in a computer-readable medium, such as memory 330 and/or storage component 340. A computer-readable medium may be defined as a non-transitory memory device. A memory device may include memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional, fewer, different, or differently arranged components than those shown in FIG. 3. Additionally, or alternatively, one or more components of device 300 may perform one or more functions described as being performed by another one or more components of device 300.

Figure 4:
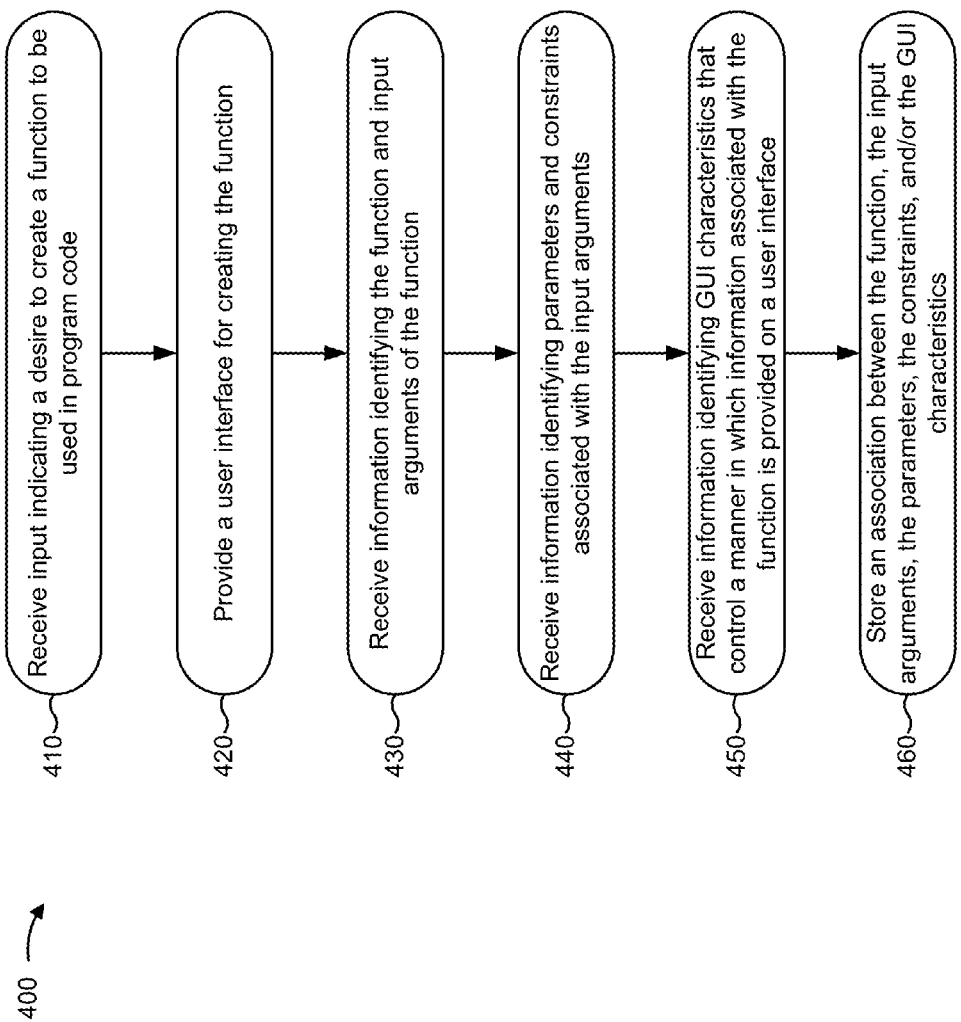
FIG. 4 is a flow chart of an example process for creating a graphical user interface for a function to be used in program code.

FIG. 4 is a flow chart of an example process 400 for creating a graphical user interface for a function to be used in program code. In some implementations, one or more process blocks of FIG. 4 may be performed by client device 210. In some implementations, one or more process blocks of FIG. 4 may be performed by another device or a group of devices separate from or including client device 210, such as server device 230.

As shown in FIG. 4, process 400 may include receiving input indicating a desire to create a function to be used in program code (block 410), and providing a user interface for creating the function (block 420). For example, client device 210 (e.g., TCE 220) may receive input, from a developer (e.g., a user of client device 210), indicating a desire to create a function to be used in program code. In some implementations, the developer may interact with a user interface (e.g., via an input mechanism, such as a menu item, a button, etc.) to indicate the desire to create a function. Based on receiving the input, client device 210 (e.g., TCE 220) may provide a user interface for creating the function.

Additionally, or alternatively, client device 210 may receive input indicating a desire to edit an existing function. For example, client device 210 may receive a request, from the developer, to access the function. The request may include information identifying the function, such as a function identifier (e.g., a name and/or a function call of the function), and information identifying a memory location at which the function (and/or information associated with the function, such as a function signature) is stored. The memory location may be located within client device 210 or external to, and possibly remote from, client device 210. Client device 210 may, based on receiving the request, retrieve the function from the memory location. In some implementations, client device 210 may provide, for display, a user interface that depicts all or a portion of the function and/or the function signature, and may permit the developer to edit the function and/or the function signature.

As further shown in FIG. 4, process 400 may include receiving information identifying the function and input arguments of the function (block 430), and receiving information identifying parameters and constraints associated with the input arguments (block 440). For example, client device 210 (e.g., TCE 220) may receive input identifying the function, such as a function identifier (e.g., a name of the function, a function call that causes the function to be called and/or executed, etc.). Additionally, or alternatively, client device 210 may receive information identifying the input arguments of the function, such as a name of one or more input arguments of the function. The developer may specify one or more input arguments on which the function is to be performed, and/or that control a behavior of the function, when the function is executed (e.g., by client device 210).

Additionally, or alternatively, client device 210 (e.g., TCE 220) may receive information identifying one or more parameters associated with the function and/or an input argument of the function. A parameter, as used herein, may refer to information that defines potential values of an input argument. For example, a parameter may include a required data type of a value of an input argument (e.g., an integer value, a string value, a Boolean value, an array of values, a combination of data types, etc.), a default value of an input argument (e.g., a value to be used for the input argument when a user does not specify a non-default value for the input argument), an explicit identification of potential values of an input argument (e.g., integer values between 1 and 7, a value of either true or false, etc.), or the like. Additionally, or alternatively, a parameter may refer to information that identifies a manner in which the function behaves when executed. For example, the parameter may specify a manner in which input arguments are processed to generate an output, and/or a manner in which the processing occurs.

Additionally, or alternatively, client device 210 (e.g., TCE 220) may receive information identifying one or more constraints associated with the function and/or an input argument of the function. A constraint, as used herein, may refer to a condition that must be satisfied by a value of an input argument in order for the function to be valid (e.g., for the function to operate properly and/or without generating an error). For example, a constraint may require values for the input arguments to be input to the function in a particular order, may require a value to be specified for one or more input arguments, may require that a value of an input argument be a particular data type, may require that a value of an input argument matches a potential value (e.g., is within a range of potential values), may require a particular relationship between values of one or more input arguments (e.g., that a first value be greater than a second value), or the like.

In some implementations, client device 210 (e.g., TCE 220) may receive information identifying a program (e.g., program code, a syntax tree, etc.) that may be used to determine a parameter, a constraint, and/or an input argument. The program, when executed, may identify the parameter, the constraint, and/or the input argument. For example, the program, when executed, may identify one or more potential values of an input argument.

In some implementations, client device 210 may receive the information identifying the function, the input arguments, the parameters, the constraints, and/or the program via a user interface provided to a developer (e.g., a user of client device 210). The developer may interact with the user interface to provide the information to client device 210. Additionally, or alternatively, client device 210 may receive the information and/or a portion of the information from another device, such as server device 230.

As further shown in FIG. 4, process 400 may include receiving information identifying GUI characteristics that control a manner in which information associated with the function is provided on a user interface (block 450). For example, client device 210 (e.g., TCE 220) may receive, from a developer (e.g., a user of client device 210), information identifying a GUI characteristic. In some implementations, client device 210 may receive the information identifying the GUI characteristic from a developer (e.g., a user of client device 210) interacting with a user interface, and/or from another device, such as server device 230.

The GUI characteristic may control a manner in which information is depicted on a user interface provided to a user that is using the function in program code. For example, the GUI characteristic may specify when the user interface is provided (e.g., when a user types a function identifier, when a user interacts with TCE 220 in a particular way, when a user selects an input mechanism, etc.), a manner in which information is represented on the user interface (e.g., which input arguments are represented on the user interface), a spatial relationship between the input argument representations (e.g., left to right based on an order of input arguments, top to bottom based on the order, etc.), which input argument representations are displayed by default and which require user interaction to display, whether to display all input argument representations at once or whether to display input argument representations one at a time as a user inputs values for the input arguments, etc.), an input mechanism that permits a user to input a value for an input argument (e.g., a drop-down list, a check box, a text box, a button, a slider or track bar, a menu, a combo box, a list box, a radio button, a search box, etc.), help information that may be provided (e.g., a tooltip associated with a function, an input argument, an input mechanism, etc.), or the like.

As further shown in FIG. 4, process 400 may include storing an association between the function, the input arguments, the parameters, the constraints, and/or the GUI characteristics (block 460). For example, client device 210 may store an association between the received information, including information associated with the function, the input arguments, the parameters, the constraints, the GUI characteristics, and/or the program. In some implementations, client device 210 may store the information in a memory location located within client device 210. Additionally, or alternatively, client device 210 may provide the information to another device (e.g., external to and/or remote from client device 210), such as server device 230, for storage.

In some implementations, client device 210 may store the information in a data structure (e.g., a table). The data structure may store an indication of a relationship between the information, such as an indication that the input argument are input arguments of the function, the parameters are parameters of the function and/or the input arguments, the constraints are constraints of the function and/or the input arguments, the GUI characteristics are associated with the function and/or the input arguments, the program (e.g., that may be used to identify the parameters, the input arguments, the constraints, the GUI characteristics, etc.), etc. Client device 210 may retrieve the information from the data structure to generate a user interface for a user using the function in program code.

While a series of blocks has been described with regard to FIG. 4, the blocks and/or the order of the blocks may be modified in some implementations. Additionally, or alternatively, non-dependent blocks may be performed in parallel.

Figure 5A:
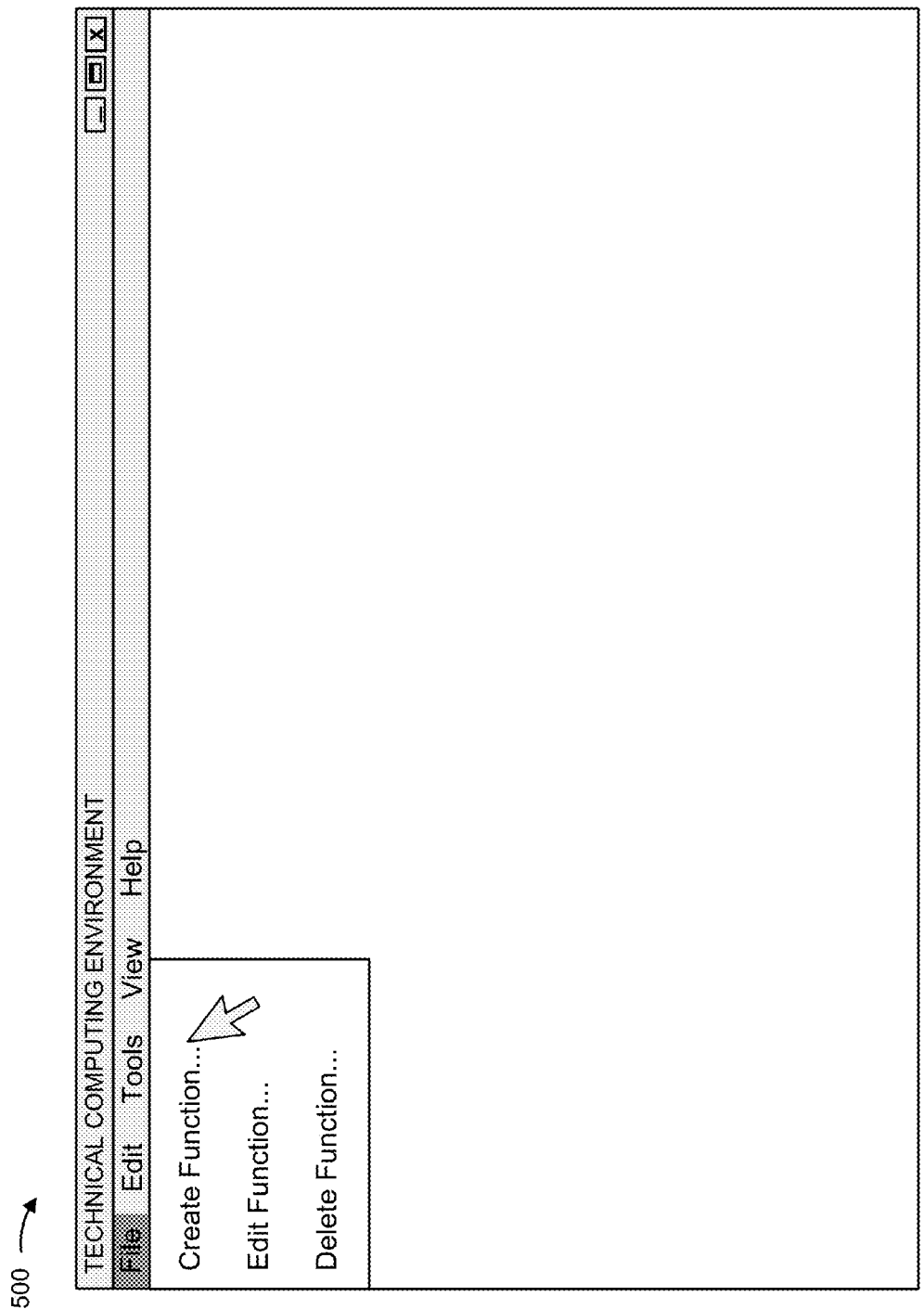
FIGS. 5A-5E are diagrams of an example implementation relating to the example process shown in FIG. 4.
Figure 5B:
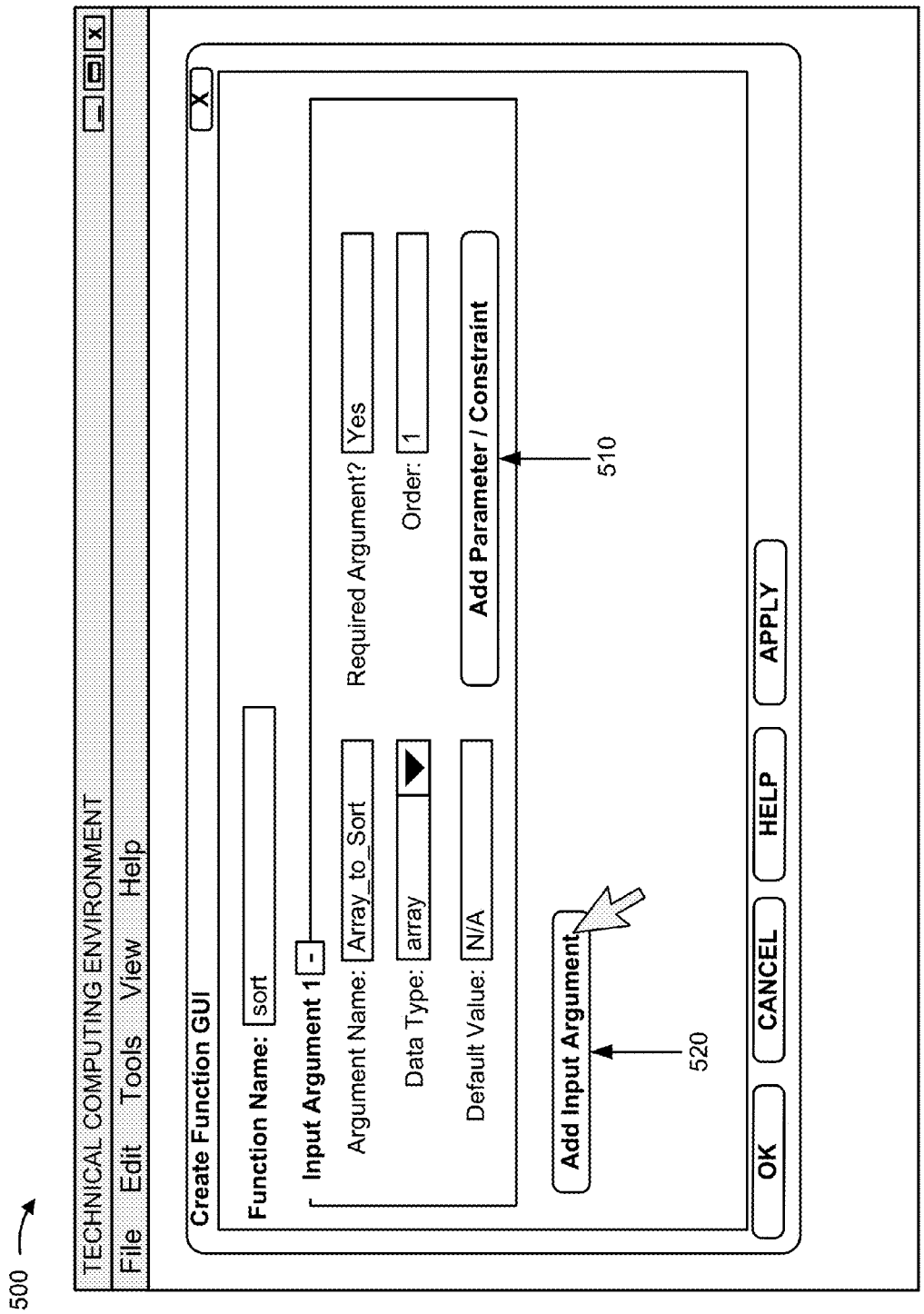

FIGS. 5A-5E are diagrams of an example implementation 500 relating to example process 400 shown in FIG. 4. As shown in FIG. 5A, client device 210 may provide a user interface that permits a developer to create, edit, and/or delete a function. The developer may provide input, via the user interface, indicating a desire to create a function to be used in program code. For example, the developer may select a "Create Function" menu item, as shown. Developer selection of the "Create Function" menu item may cause client device 210 to provide a "Create Function GUI," as shown in FIG. 5B.

The developer may interact with the Create Function GUI to create a function and/or specify a function signature. In FIG. 5B, assume that the developer has input "sort" as a function identifier (e.g., a name of the function), has specified "Array_to_Sort" as an input argument of the sort function, has specified that a value of the Array_to_Sort input argument is required to be an array data type, has specified that the Array_to_Sort input argument does not have a default value, has specified that Array_to_Sort is a required input argument (e.g., is required to have a value for the function to be valid), and has specified that the Array_to_Sort input argument is first in order of a set of input arguments associated with the sort function.

As shown by reference number 510, the developer may interact with an "Add Parameter/Constraint" input mechanism (e.g., a button) to specify additional parameters and/or constraints associated with the sort function and/or the Array_to_Sort input argument. As shown by reference number 520, the developer may interact with an "Add Input Argument" input mechanism (e.g., a button) to add an additional input argument and to specify parameters, constraints, and/or GUI characteristics associated with the additional input argument.

Figure 5C:
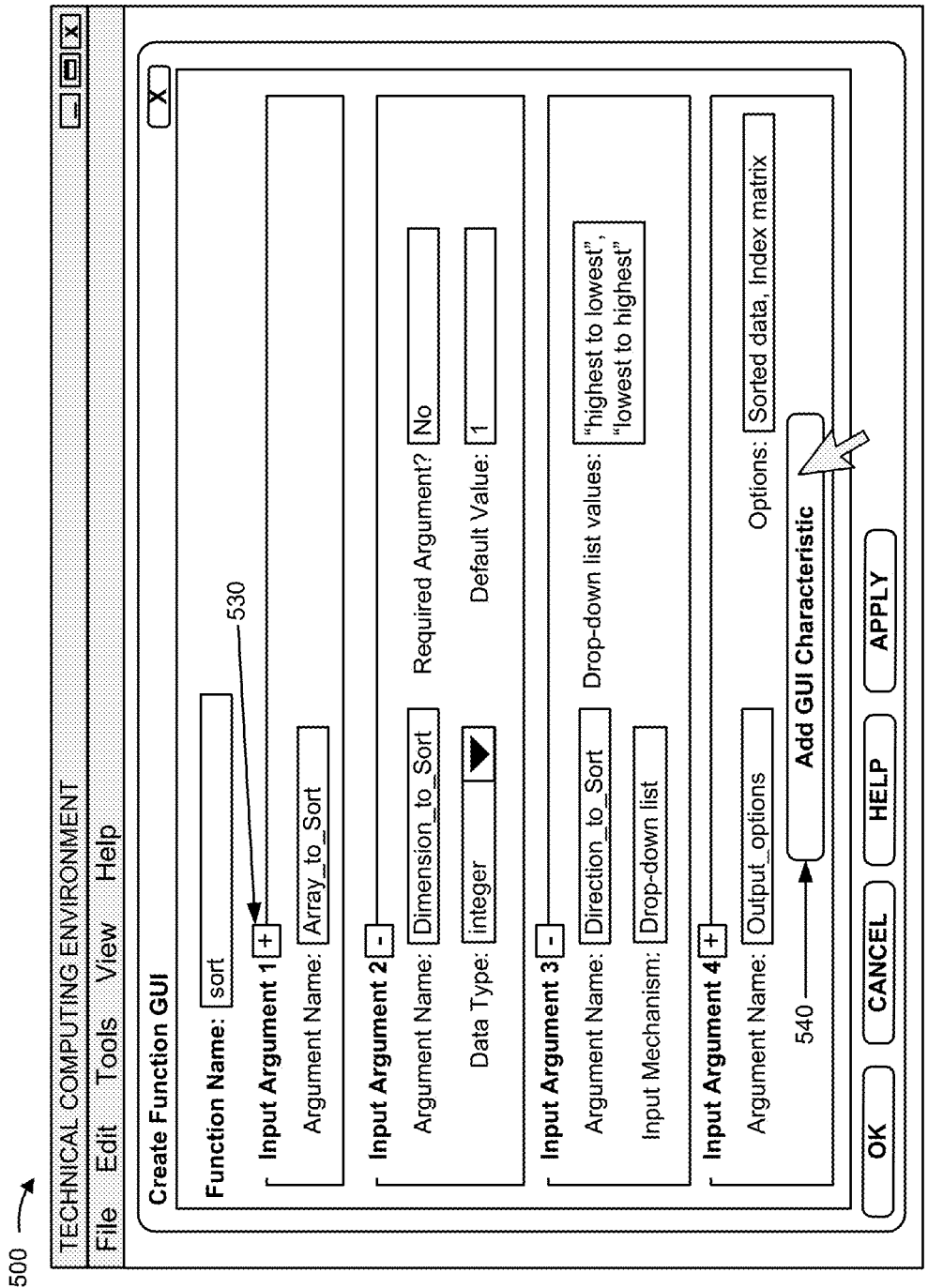

As shown in FIG. 5C, assume that the developer has added additional input arguments, parameters, constraints, and GUI characteristics to the sort function. For example, assume that the developer has created a second input argument named "Dimension_to_Sort," has specified that a value of the Dimension_to_Sort input argument is required to be an integer data type, has specified that Dimension_to_Sort is not a required input argument, and has specified that the Dimension_to_Sort input argument has a default value of one (e.g., when a user does not input a value for the Dimension_to_Sort input argument).

Further, assume that the developer has created a third input argument named "Direction_to_Sort," has specified that input be provided for the Dimension_to_Sort input argument via a drop-down list, and has specified two potential values for the input argument, to be displayed in the drop-down list, as "highest to lowest" and "lowest to highest."

Finally, assume that the developer has created a fourth input argument named "Output_options," and has defined two options for the Output_options as "sorted data" and "index matrix."

As shown by reference number 530, the Create Function GUI may provide a mechanism for the developer to show or hide information associated with an input argument. As shown by reference number 540, the developer may interact with an "Add GUI Characteristic" input mechanism (e.g., a button) to add an additional GUI characteristic.

Figure 5D:
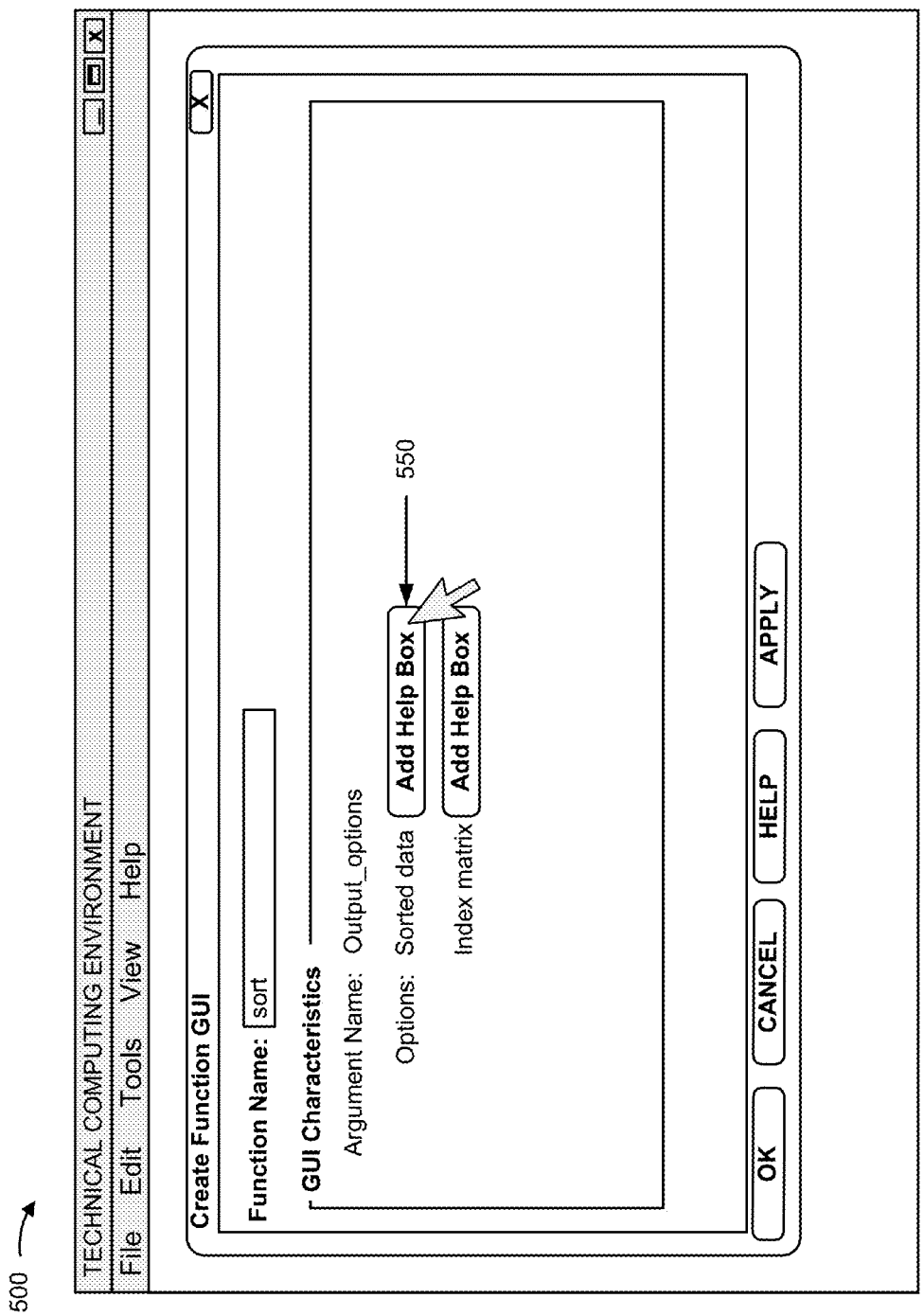
Figure 5E:
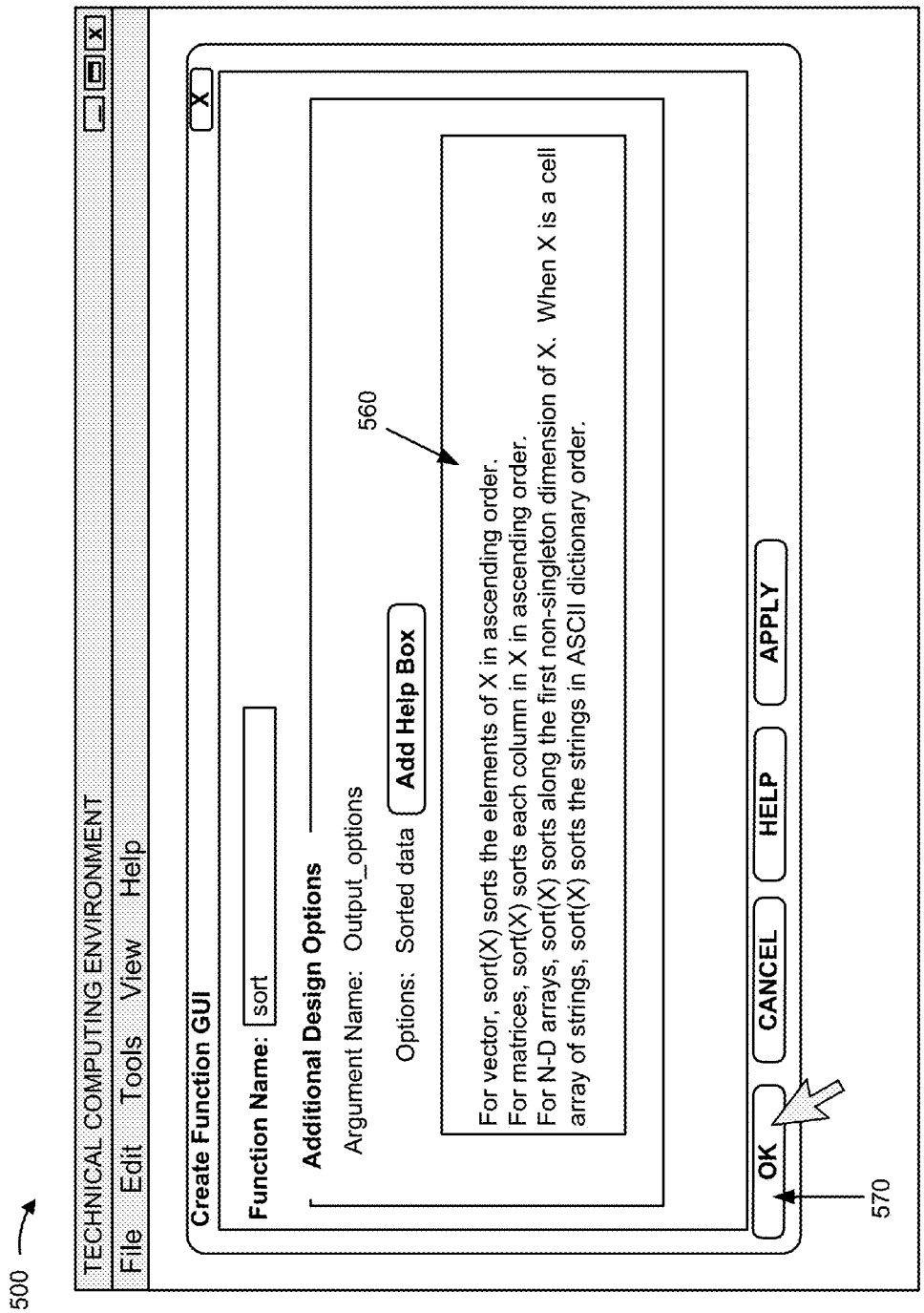

As shown in FIG. 5D, assume that the user has interacted with the "Add GUI Characteristic" input mechanism. Based on the interaction, client device 210 may provide a user interface that permits the developer to input GUI characteristics associated with the sort function and/or an input argument of the sort function. For example, as shown by reference number 550, the developer may interact with an "Add Help Box" input mechanism (e.g., a button) to specify help information that may be provided to a user when the user is using the function in program code. As shown in FIG. 5E, assume that the developer has input help information into a text box, as shown by reference number 560. Finally, assume that the developer has indicated that the developer has finished creating (or editing) the sort function, such as by interaction with an "OK" input mechanism, as shown by reference number 570.

Based on the developer interaction with the OK button, client device 210 may store an association between the information input by the developer via the Create Function GUI, such as information associated with the sort function, the input arguments of the sort function, the parameters of the sort function and/or the input arguments, the constraints associated with the sort function and/or the input argument, the GUI characteristics associated with the sort function and/or the input arguments, etc. Client device 210 may use the stored information to provide a user interface that assists a user in using the sort function in program code.

Figure 6:
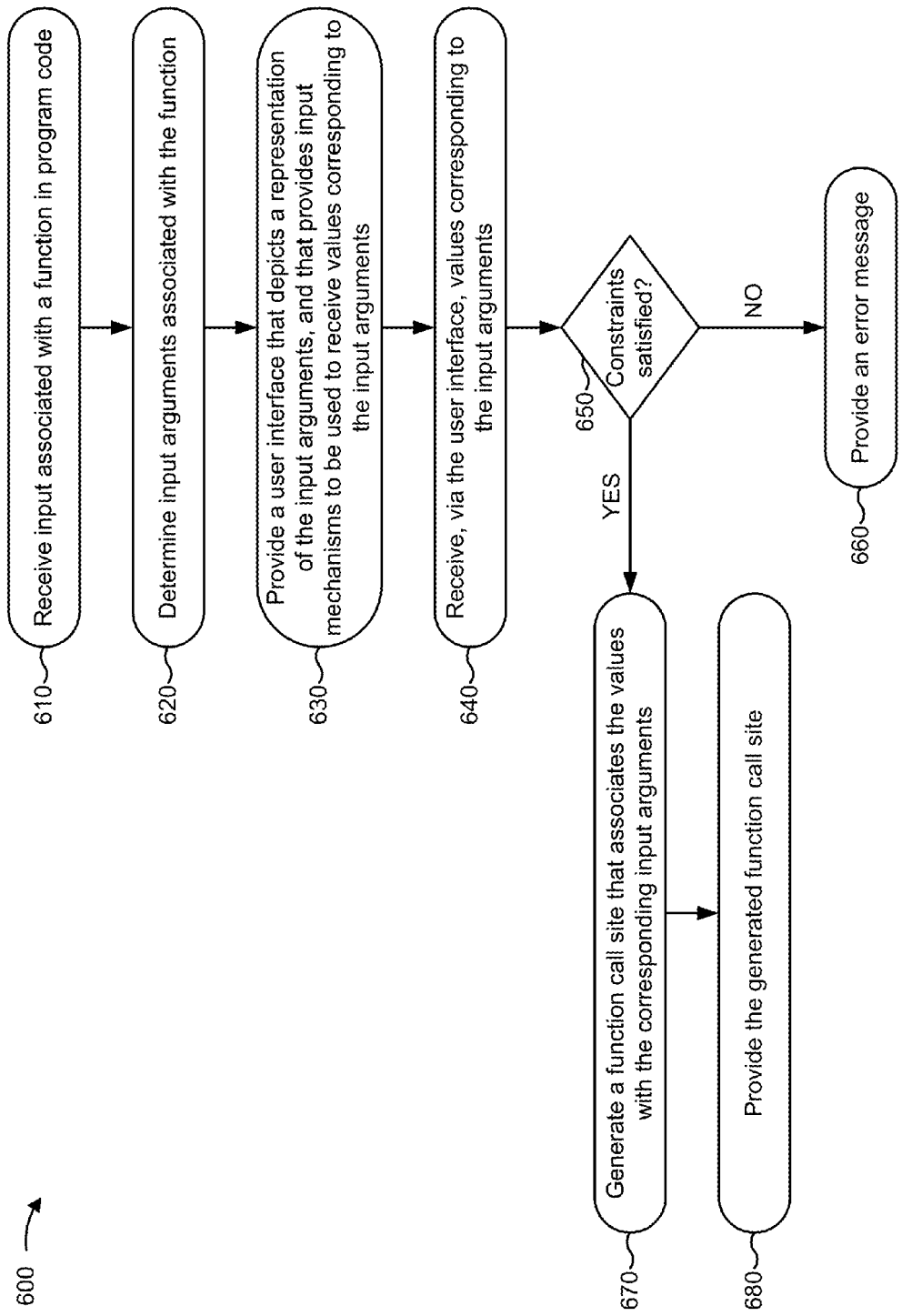
FIG. 6 is a flow chart of an example process for specifying values associated with a function using a created graphical user interface.

FIG. 6 is a flow chart of an example process 600 for specifying values associated with a function using a created graphical user interface. In some implementations, one or more process blocks of FIG. 6 may be performed by client device 210. In some implementations, one or more process blocks of FIG. 6 may be performed by another device or a group of devices separate from or including client device 210, such as server device 230.

As shown in FIG. 6, process 600 may include receiving input associated with a function in program code (block 610), determining input arguments associated with the function (block 620), and providing a user interface that depicts a representation of the input arguments, and that provides input mechanisms to be used to receive values corresponding to the input arguments (block 630). For example, client device 210 may receive input indicating a desire to use a function in program code. The input may include, for example, a user inputting (e.g., typing) a function identifier (e.g., a name and/or a function call of a function) in program code, a user interacting with an input mechanism (e.g., a button, a menu item, etc.), or other input.

Based on the input, client device 210 may determine one or more input arguments associated with the function. For example, client device 210 may search a data structure to identify the function, and may determine input arguments associated with the function based on a stored association between the function and the input arguments. The data structure may be populated based on input received from a developer interacting with a function creator user interface, as described elsewhere herein.

Client device 210 may provide a user interface that depicts a representation of the one or more input arguments, and that provides one or more input mechanisms to be used to receive values corresponding to the input arguments. For example, client device 210 may provide a name of an input argument as the representation of the input argument. Additionally, or alternatively, client device 210 may provide information associated with the input argument. For example, client device 210 may provide information that identifies parameters, constraints, potential values, etc., associated with the input argument. Additionally, or alternatively, client device 210 may provide one or more input mechanisms that permit a user to input a value for the input argument. Client device 210 may provide the representation of the input arguments, the information associated with the input arguments, and/or the input mechanisms associated with the input arguments based on input received from a developer interacting with a function creator user interface, as described elsewhere herein.

In some implementations, client device 210 (e.g., TCE 220) may determine a parameter, a constraint, a potential value, etc., based on a program (e.g., program code, a syntax tree, etc.). Client device 210 may determine the program based on input received from a developer interacting with a function creator user interface, as described elsewhere herein. Client device 210 may execute the program to identify the parameter, the constraint, etc. For example, client device 210 may execute the program to determine a potential value for an input argument, and may depict a representation of the potential value via the user interface.

Additionally, or alternatively, client device 210 (e.g., TCE 220) may determine a potential value based on a constraint and/or based on a search criterion. Client device 210 may determine the constraint and/or the search criterion based on input received from a developer interacting with a function creator user interface. Client device 210 may perform a search for potential values, using the search criterion, and may depict, via the user interface, a representation of potential values determined via the search. For example, a function may require a particular type of image (e.g., a jpeg image) as an input. When a user types a function identifier, client device 210 may perform a search for images of the particular type. In some implementations, a developer may specify a search space associated with the function (e.g., a user's workspace, a user's computer, particular folders and/or files to be searched, etc.), and client device 210 may perform the search based on the search space.

As further shown in FIG. 6, process 600 may include receiving, via the user interface, values corresponding to the input arguments (block 640), and verifying whether the values satisfy constraints associated with the input arguments (block 650). For example, client device 210 may receive, via user input to the user interface, one or more values that correspond to the one or more input arguments. Client device 210 may use the values when executing the function (e.g., may perform the function using the values and/or may control a behavior of the function based on the values).

In some implementations, client device 210 may verify that the one or more values satisfy one or more constraints associated with the input arguments. For example, client device 210 may determine the constraints using information stored in a data structure, and/or based on input received from a developer interacting with a function creator user interface, as described elsewhere herein.

If the constraints are not satisfied (block 650—NO), then process 600 may include providing an error message (block 660). For example, client device 210 may determine that a constraint, associated with the function and/or an input argument of the function, is not satisfied, and may provide an error message. The error message may indicate that the constraint is not satisfied, and may provide information that guides a user in satisfying the constraint. For example, the error message may indicate that a value, input by the user, does not satisfy a constraint, and may provide an indication of a value that would satisfy the constraint.

As one example, assume that the constraint requires that the value be of an integer data type, and that the value, input by the user, is a floating point data type (e.g., 5.3). In this situation, client device 210 may determine that the value does not satisfy the constraint, and may provide an error indicating that the value must be an integer data type. In some implementations, client device 210 may prompt the user to indicate whether to use a value of 5 (instead of a value of 5.3).

If the constraints are satisfied (block 650—YES), then process 600 may include generating a function call site that associates the values with the corresponding input arguments (block 670), and providing the generated function call site (block 680). For example, client device 210 may determine that the constraints are satisfied, and may generate a function call site based on determining that the constraints are satisfied. A function call site may refer to information (e.g., a portion of program code, a line of program code, etc.) that calls a function (e.g., that causes the function to be executed). The function call site may include a function identifier and/or the values, input by the user, corresponding to the input arguments of the function. For example, if a user inputs a value of x for a first input argument of a function named func, and inputs a value of y for a second input argument of func, then client device 210 may generate the function call site func(x, y).

In some implementations, client device 210 may provide the generated function call site for display on a user interface (e.g., along with information, such as program code, other than the generated function call site). Additionally, or alternatively, client device 210 may provide natural language text that describes the generated function call site (e.g., the values for the input arguments). In some implementations, client device 210 may provide the generated function call site to a storage device (e.g., included in client device 210 and/or another device, such as server device 230). Additionally, or alternatively, client device 210 may execute the generated function call site (e.g., to execute the generated function) along with other program code.

While a series of blocks has been described with regard to FIG. 6, the blocks and/or the order of the blocks may be modified in some implementations. Additionally, or alternatively, non-dependent blocks may be performed in parallel.

Figure 7A:
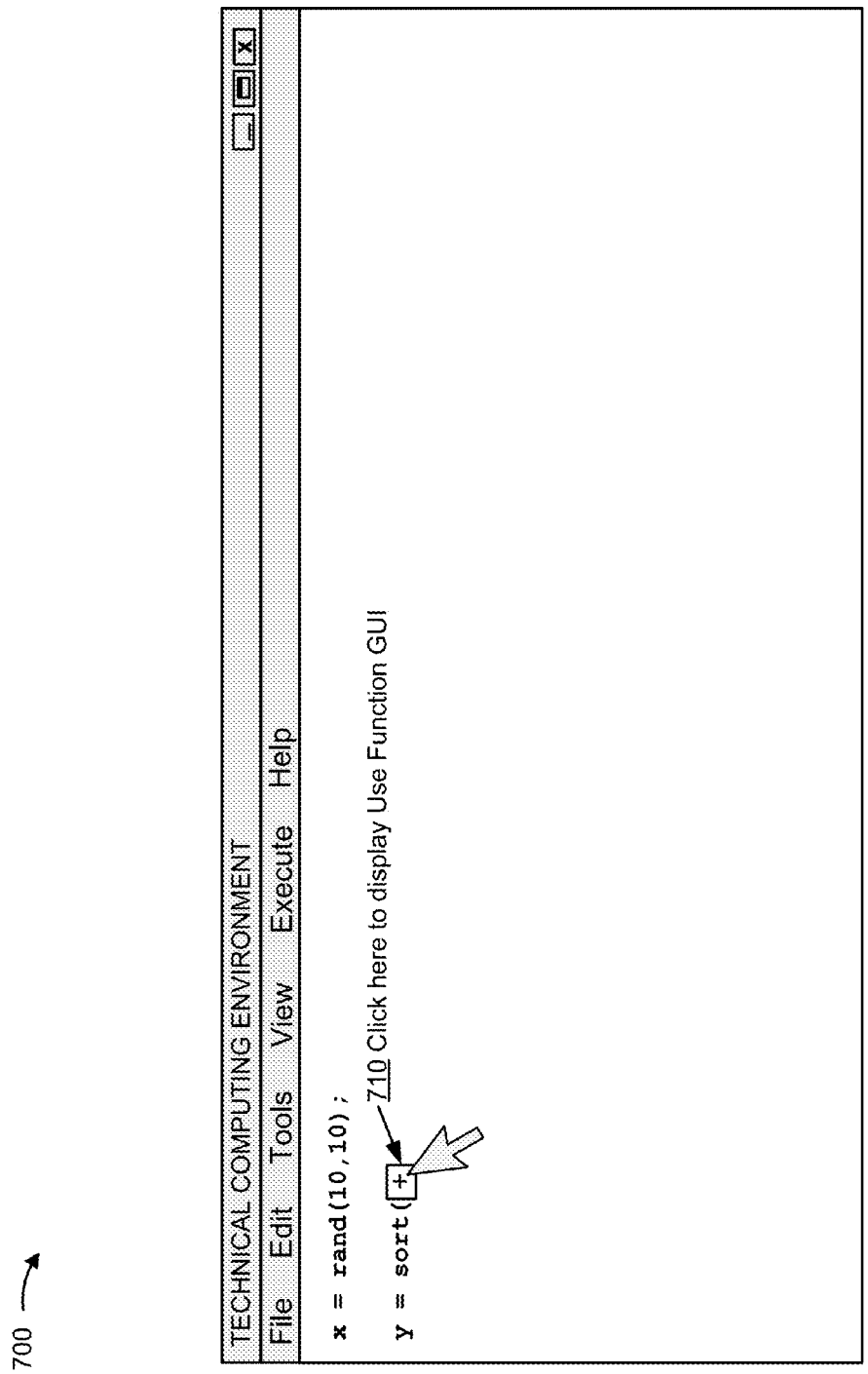
FIGS. 7A-7D are diagrams of an example implementation relating to the example process shown in FIG. 6.

FIGS. 7A-7D are diagrams of an example implementation 700 relating to the example process shown in FIG. 6. As shown in FIG. 7A, client device 210 may provide TCE 220 that allows a user to input program code.

As further shown in FIG. 7A, assume that the user has input program code, such as by typing program code into a text editor. The program code may include a code section shown as x=rand(10,10) that represents program code that, when executed, generates a random ten by ten array of values and stores the array in a variable named x. The user may also input a code section shown as y=sort(, which may represent a function named sort (e.g., a beginning of a function call site for a sort function). Upon detecting that the user has input program code for calling the sort function, client device 210 may compare the name of the sort function (e.g., sort) to names of functions stored in a data structure. Upon determining that the data structure stores the sort name, client device 210 may provide an input mechanism for displaying a GUI that allows the user to input values for the input arguments of the sort function (e.g., a "Use Function GUI"), as shown by reference number 710. The provided input mechanism may be indicated, for example, in the data structure. Alternatively, upon detecting that the user has input program code for calling the sort function, client device 210 may provide the Use Function GUI without first providing an input mechanism for displaying the Use Function GUI.

Figure 7B:
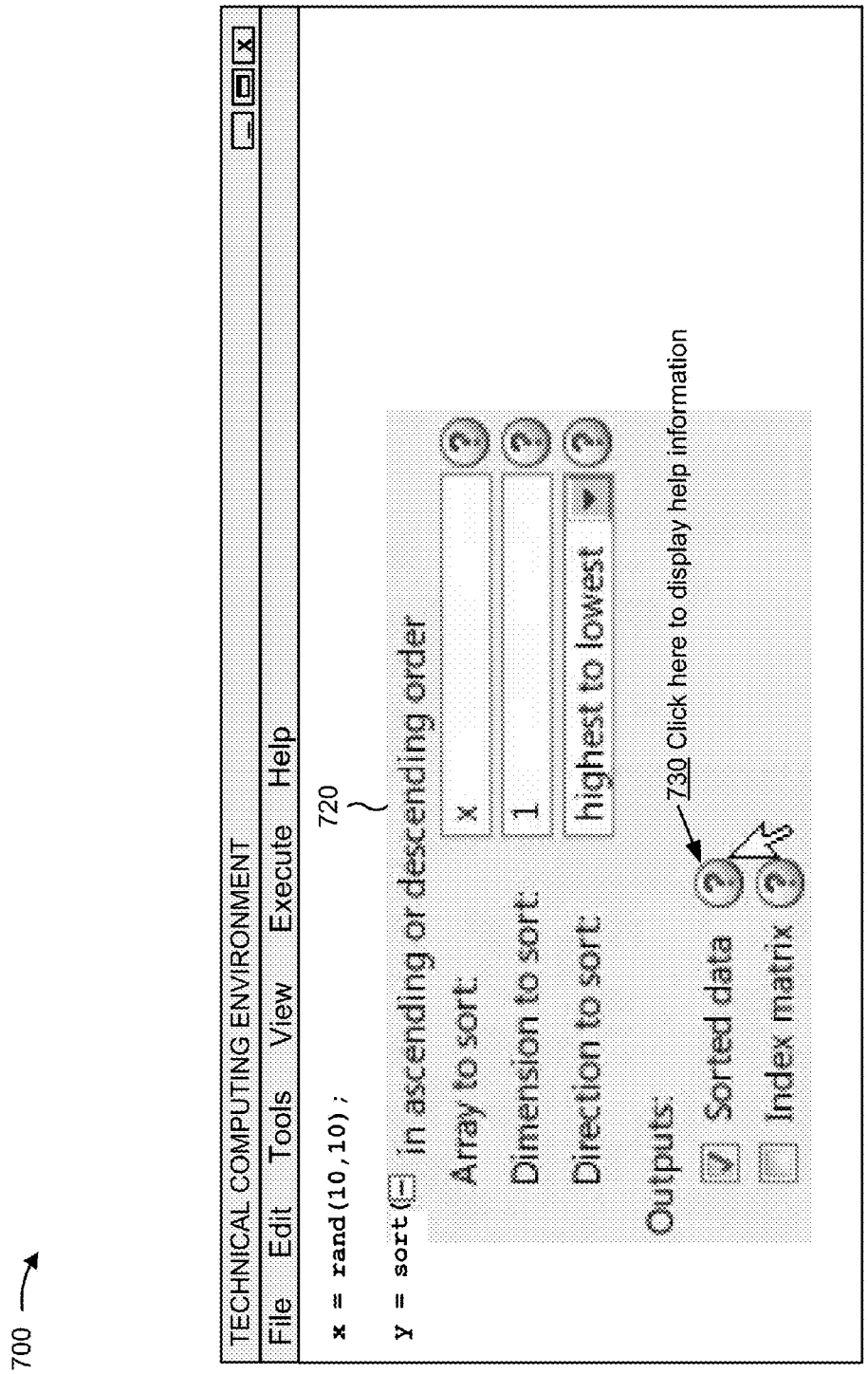

As shown in FIG. 7B, assume that the user has interacted with the input mechanism shown by reference number 710 (FIG. 7A), and client device 210 has displayed a Use Function GUI 720. Use Function GUI 720 may display information associated with the sort function, such as an operation performed by the sort function, shown as "[sort] in ascending or descending order." Use Function GUI 720 may also provide a representation of the input arguments of the sort function, shown as "array to sort," "dimension to sort," "direction to sort," and two options for how the output of the sort function is provided (e.g., "sorted data" and "index matrix"). Assume that the input arguments of the sort function correspond to the input arguments input by a developer interacting with a function creator user interface, as described herein in connection with FIGS. 5A-5E.

As further shown in FIG. 7B, Use Function GUI 720 may provide input mechanisms that allow a user to input values for the input arguments. For example, Use Function GUI 720 may provide a text box for a user to input a value for the array to sort and dimension to sort input arguments, may provide a drop-down list for a user to input a value for the direction to sort input argument, and may provide check boxes for a user to input values associated with output option arguments. Assume that the input mechanisms are provided based on information input by a developer interacting with a function creator user interface, as described herein in connection with FIGS. 5A-5E. As shown, assume that the user has input a value of x (e.g., the variable x=rand(10,10)) as the array to sort, has input a value of 1 as the dimension to sort, has specified to sort from x along the first dimension from highest to lowest, and has selected an option of "sorted data" for the output of the sort function.

Figure 7C:
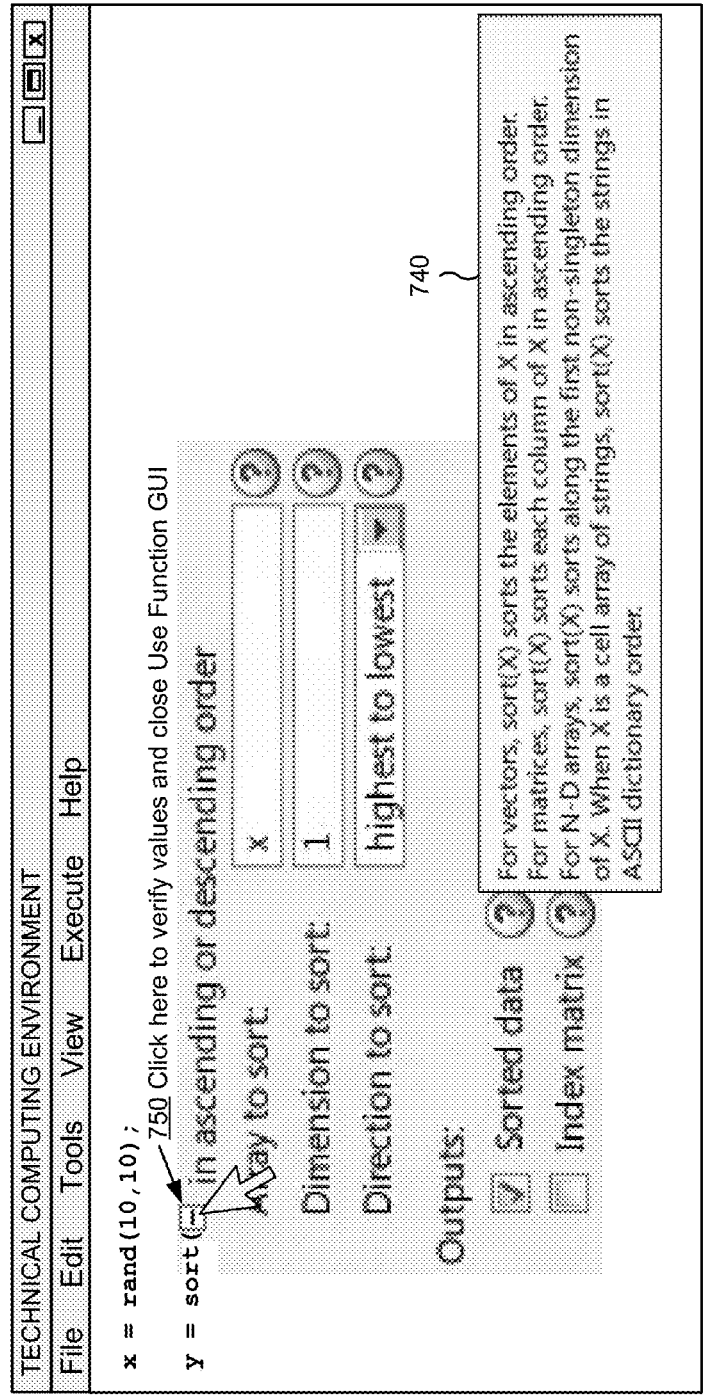

As further shown in FIG. 7B (reference number 730), Use Function GUI 720 may provide an input mechanism that allows the user to view help information. As shown in FIG. 7C, assume that the user has interacted with input mechanism 730, which causes client device 210 to display help information 740. Assume that the help information is provided based on information input by a developer interacting with a function creator user interface, as described herein in connection with FIGS. 5A-5E. As further shown in FIG. 7C (reference number 750), Use Function GUI 720 may provide an input mechanism for a user to indicate that the user has finished inputting values for the input arguments of the sort function.

When the user has indicated that the user has finished inputting values for the input arguments of the sort function, client device 210 may verify that the values satisfy constraints. The constraints may be based on information input by a developer interacting with a function creator user interface, as described herein in connection with FIGS. 5A-5E. Upon verifying the values, client device 210 may close Use Function GUI 720, may generate a function call site (e.g., program code) that associates the values with the input arguments, and may provide information, associated with the generated function call site, on a user interface of TCE 220.

Figure 7D:
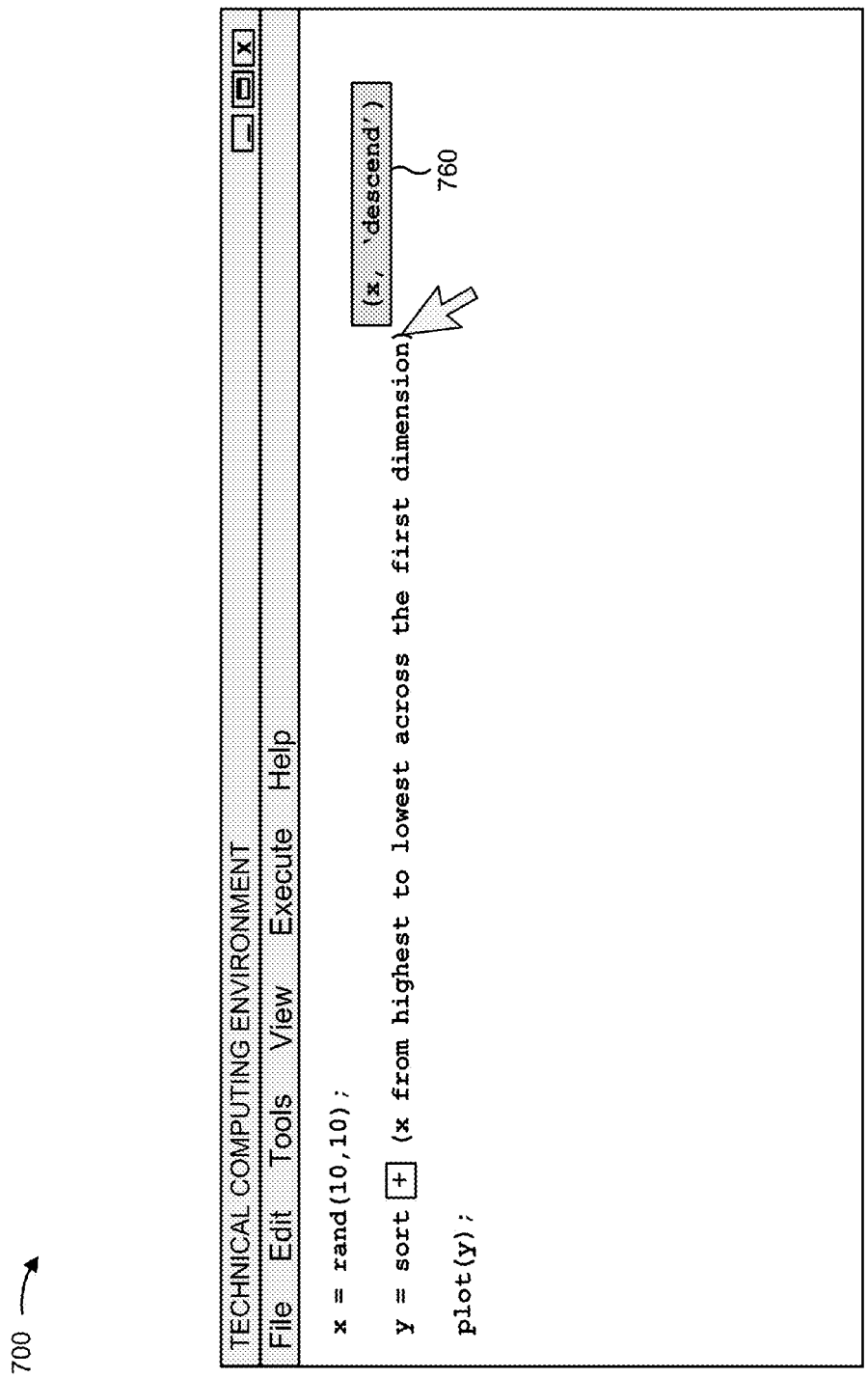

As shown in FIG. 7D, client device 210 may display information in natural language text that describes the values, input by the user, for the input arguments. For example, client device 210 may generate and provide a description, such as sort(x from highest to lowest across the first dimension), as shown. The description may be provided based on information input by a developer interacting with a function creator user interface. Client device 210 may also provide the generated function call site. As shown by reference number 760, when the user places a mouse cursor over the description, client device 210 may provide a portion of the generated function call site (or the entire generated function call site), shown as (x, 'descend') (or sort(x, 'descend')), where x is the value input for the array to sort and 'descend' is the value input for the direction to sort (e.g., generated based on user selection of "highest to lowest"). The value of 1 input for the dimension to sort may be a default value, and thus may not result in client device 210 generating program code to associate the value of 1 with the dimension to sort input argument. As further shown in FIG. 7D, the user may continue to input program code, such as plot(y), and may provide input that causes client device 210 to execute the program code shown in FIG. 7D.

FIGS. 8A-8I are diagrams of another example implementation 800 relating to the example process shown in FIG. 6. FIGS. 8A-8I depict various Use Function GUIs that may be provided via a user interface of TCE 220.

Figure 8A:
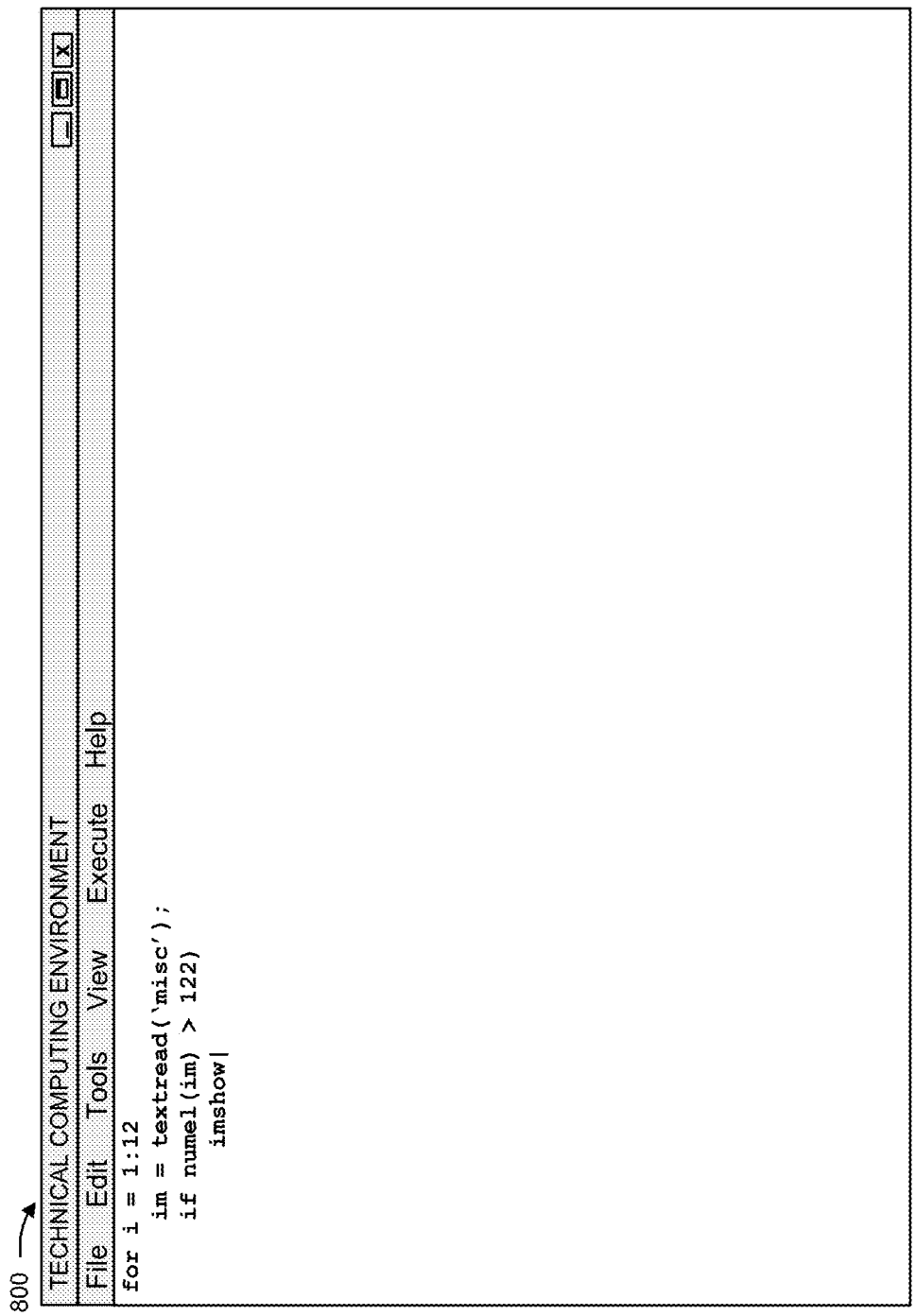

As shown in FIG. 8A, assume that a user has input a function call, in program code, associated with a function that has been previously created by a developer using a function creator user interface. Assume that the function is named imshow, and that the imshow function, when executed, causes client device 210 to display an image. The user may specify values for input arguments of the imshow function via a Use Function GUI. The values of the input arguments may specify the image and/or a manner in which the image is to be displayed.

Figure 8B:
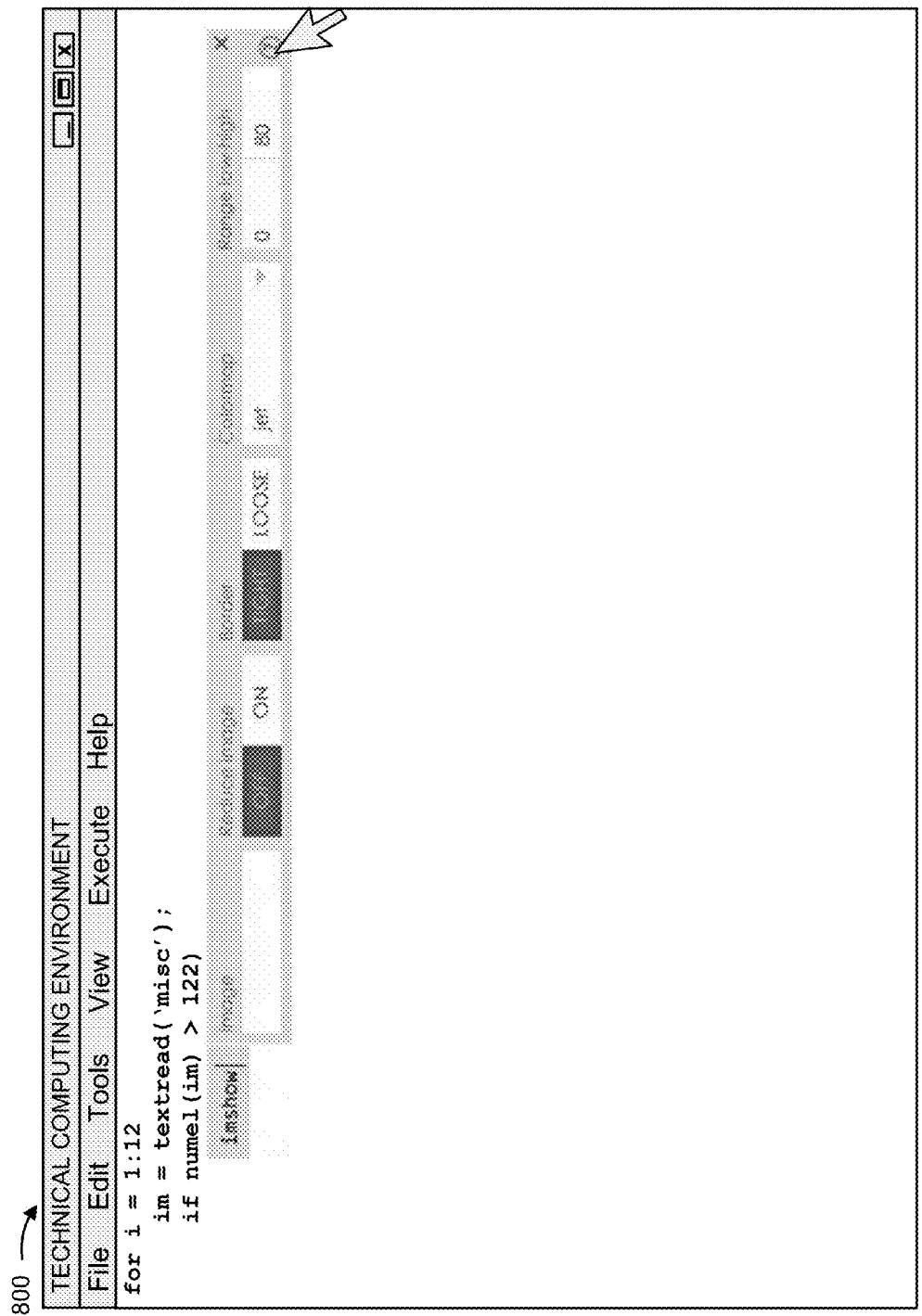

When the user types the name of the imshow function (e.g., imshow) into a user interface of TCE 220, client device 210 may cause a Use Function GUI to be displayed on the user interface, as shown in FIG. 8B. The Use Function GUI may provide a representation and an input mechanism for input arguments of the imshow function, such as image, reduce image, border, colormap, and range low-high. The user may interact with the input mechanisms, for the input arguments, to input values for the input arguments. As shown, the user may also interact with a help button that causes additional information, associated with the function and/or the input arguments, to be displayed.

Figure 8C:
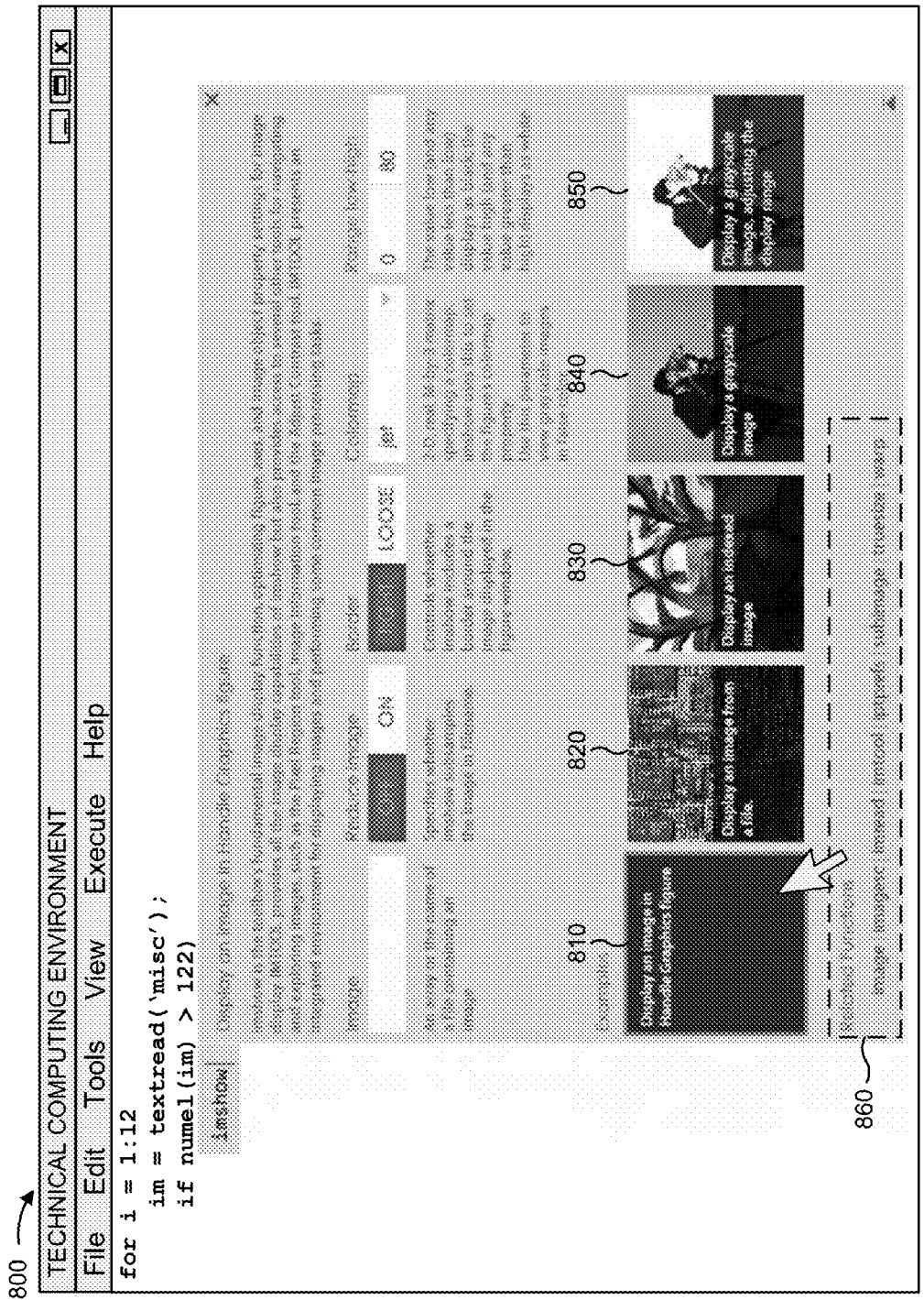

As shown in FIG. 8C, user interaction with the help button may cause additional information to be displayed via the Use Function GUI. For example, the additional information may include a description of the function, a description of the input arguments, examples 810-850 that incorporate different input arguments, and/or related functions 860 (e.g., functions related to the imshow function). User selection of a related function 860 may replace the imshow function with a related function (e.g., image, imagesc, imread, imtool, etc.), and may cause client device 210 to provide a Use Function GUI associated with the related function.

The input arguments shown in FIG. 8C may correspond to user selection of example 810, which may represent an example of displaying an image in a handle graphics figure. A handle graphics figure may create a handle for different properties of the image, and may permit a user to change a property of the image by changing a value of a handle that corresponds to the property.

Figure 8D:
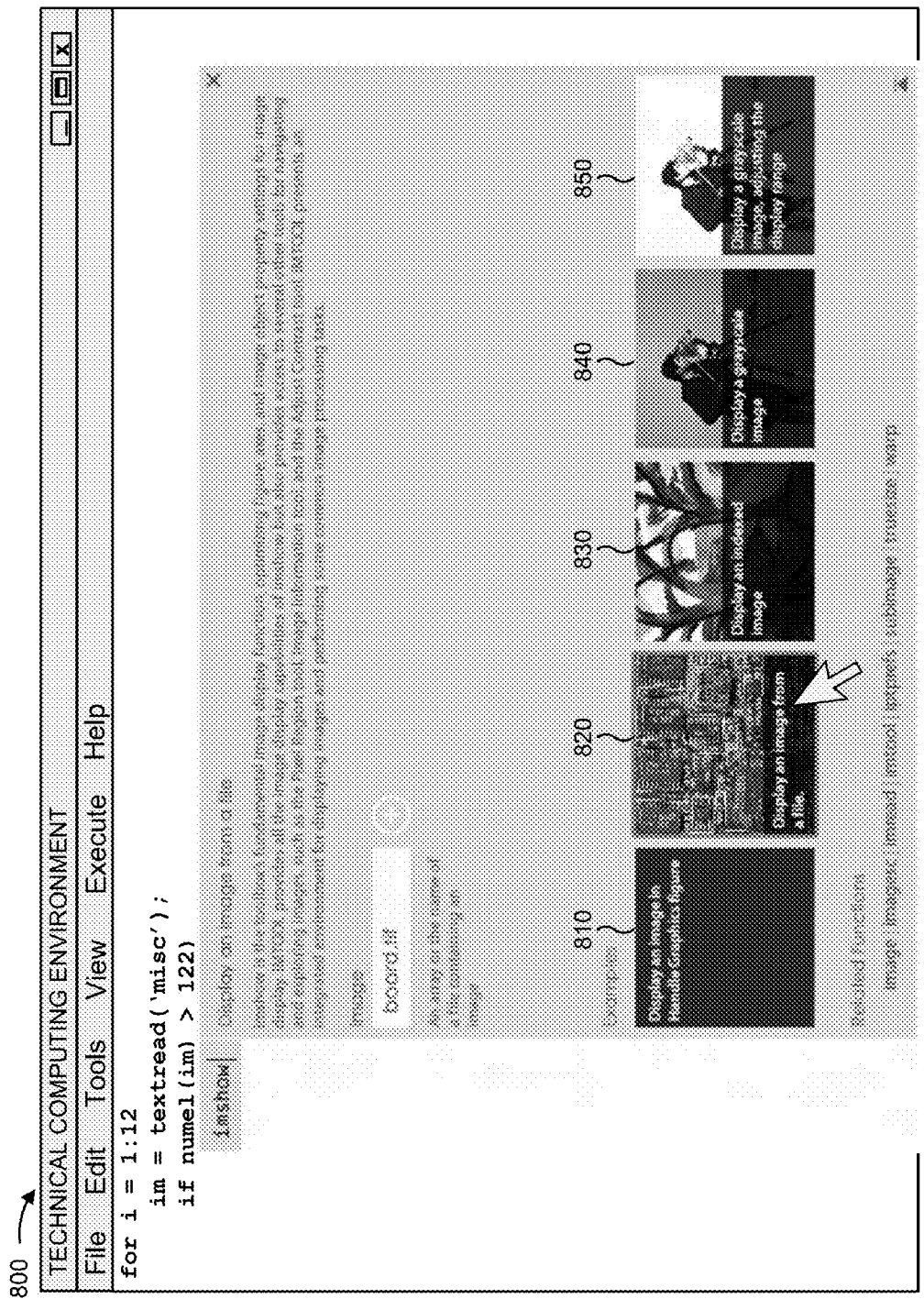

As shown in FIG. 8D, the user may select example 820, which may represent an example of displaying an image from a file. As shown, user selection of example 820 may cause client device 210 to change the input arguments represented via the Use Function GUI. For example, the represented input arguments may include an image input argument that permits the user to select an array or the name of a file containing an image.

Figure 8E:
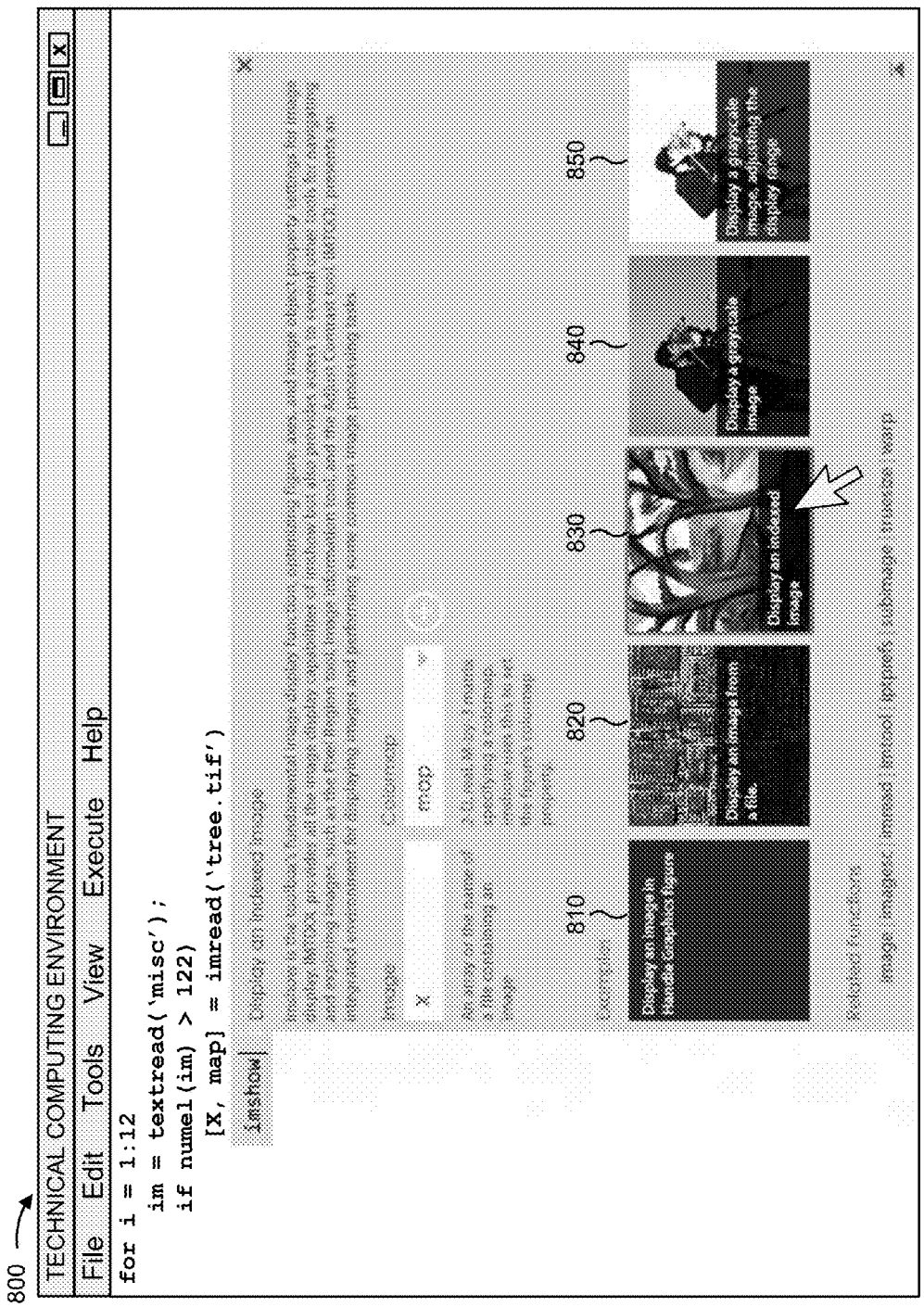

As shown in FIG. 8E, the user may select example 830, which may represent an example of displaying an indexed image. As shown, user selection of example 830 may cause client device 210 to change the input arguments represented via the Use Function GUI. For example, the represented input arguments may include the image input argument and a colormap input argument that permits the user to specify a colormap to specify color properties of the image.

Figure 8F:
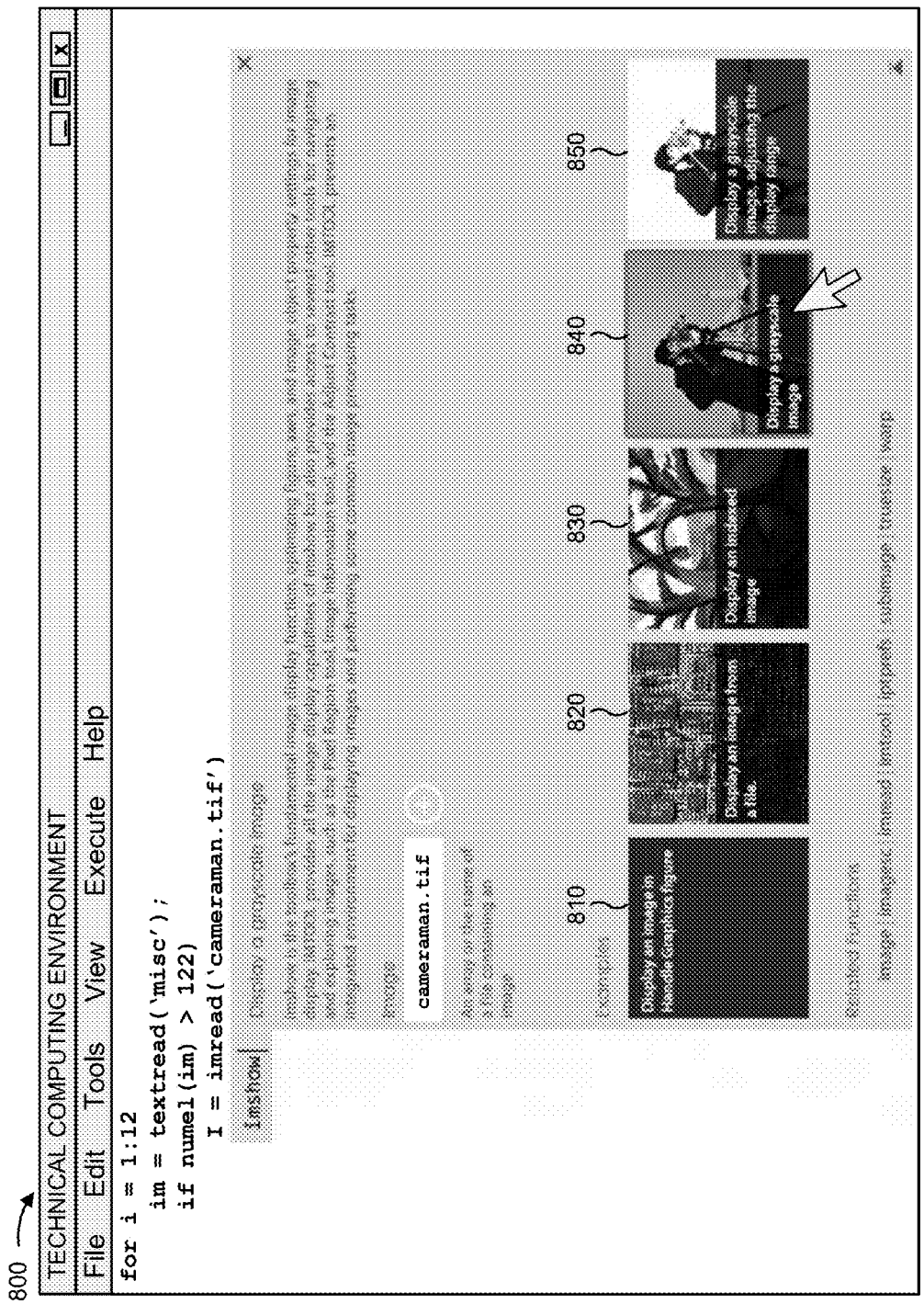

As shown in FIG. 8F, the user may select example 840, which may represent an example of displaying a grayscale image. As shown, user selection of example 840 may cause client device 210 to change the input arguments represented via the Use Function GUI. For example, the represented input arguments may include the image input argument. Selection of example 840 may also cause client device 210 to change a value of an input argument. For example, a value of a colormap associated with example 830 may specify a colormap that includes color other than grayscale color. When the user selects example 840, client device 210 may change the value of the colormap input argument to specify a colormap that only includes grayscale color.

Figure 8G:
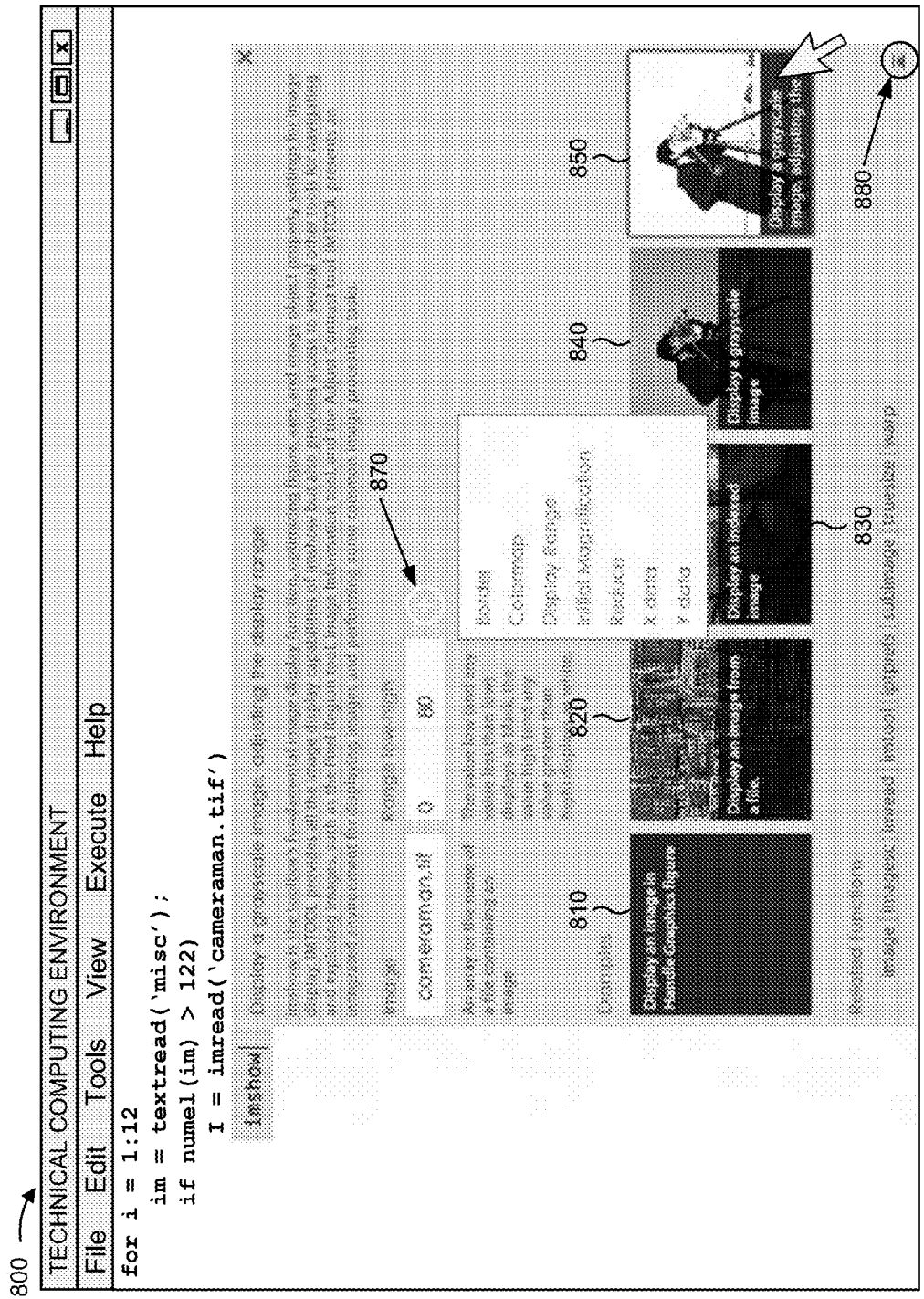

As shown in FIG. 8G, the user may select example 850, which may represent an example of displaying a grayscale image with an adjusted display range. As shown, user selection of example 850 may cause client device 210 to change the input arguments represented via the Use Function GUI. For example, the represented input arguments may include the image input argument and a range low-high input argument that permits the user to specify a low value and a high value. A pixel of the image may be associated with a color value that specifies the color of the image. The low value may indicate that all pixels with a color value below the low value are to be displayed as black, and the high value may indicate that all pixels with a color value above the high value are to be displayed as white.

As further shown in FIG. 8G, the Use Function GUI may provide an input mechanism 870 that permits a user to select other input arguments to be displayed on the Use Function GUI, and that permits the user to specify values for the other input arguments (e.g., input arguments of border, colormap, display range, initial magnification, reduce, x data, and y data, as shown). As further shown in FIG. 8G, the Use Function GUI may provide a close help input mechanism 880 that causes the Use Function GUI to hide the additional information associated with the function (e.g., the descriptions, the examples, and the related functions).

Figure 8H:
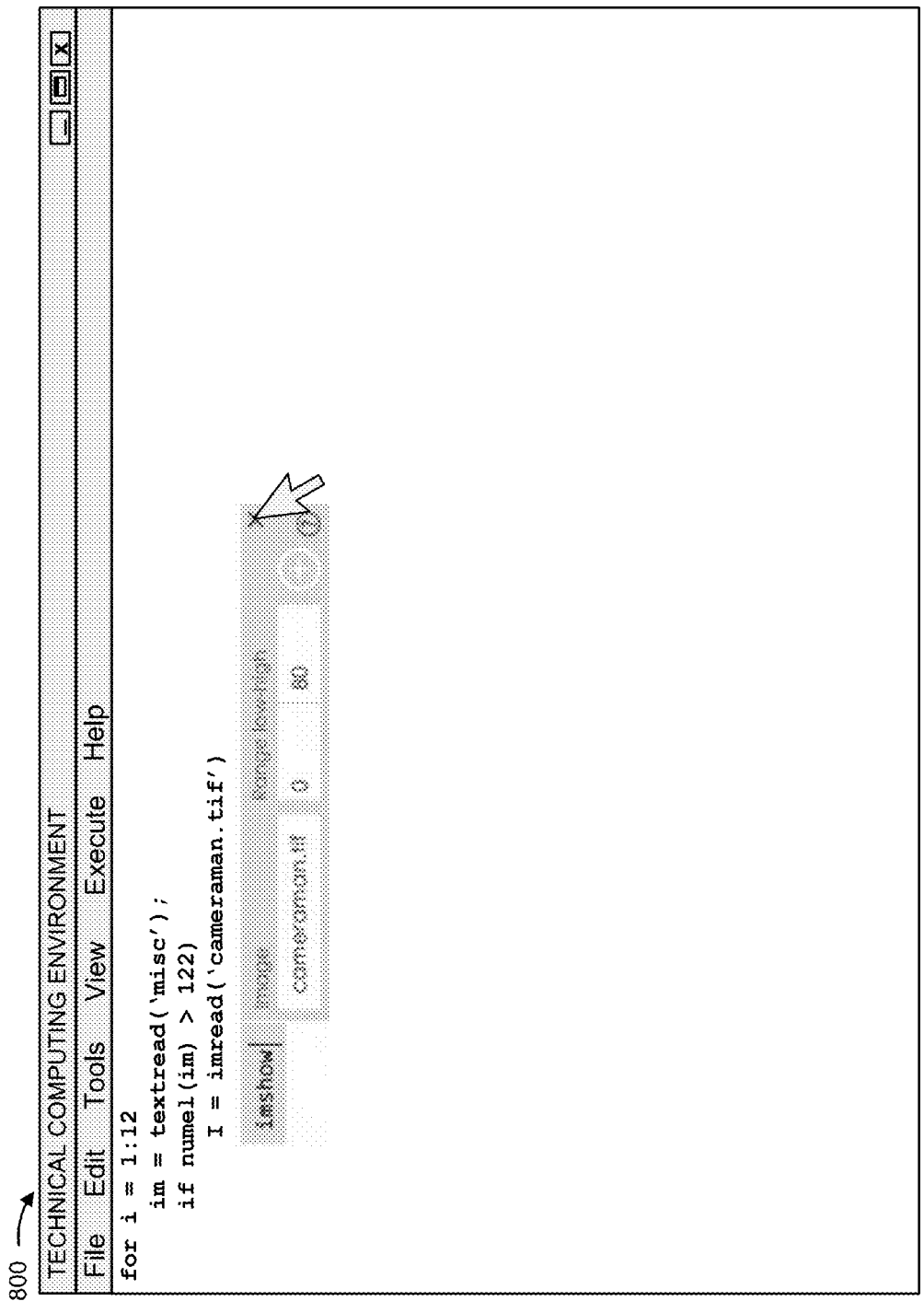

As shown in FIG. 8H, assume that the user has selected close help input mechanism 880, and client device 210 has hidden the additional information. As further shown in FIG. 8H, the user may interact with an input mechanism to indicate that the user has finished inputting values for the input arguments of the imshow function.

When the user has indicated that the user has finished inputting values for the input arguments of the imshow function, client device 210 may verify that the values satisfy constraints. Upon verifying the values, client device 210 may close the Use Function GUI, may generate a function call site (e.g., program code) that associates the values with the input arguments, and may provide information, associated with the generated function call site, on a user interface of TCE 220.

As shown in FIG. 8I, client device 210 may generate a function call site (e.g., a command line), such as imshow= ('cameraman.tif', [0 80]), based on the information input by the user via the Use Function GUI. Client device 210 may provide the generated function call site on a user interface of TCE 220. The user may input additional program code, and may provide input that causes client device 210 to execute the generated function call site and/or the additional program code.

Figure 9A:
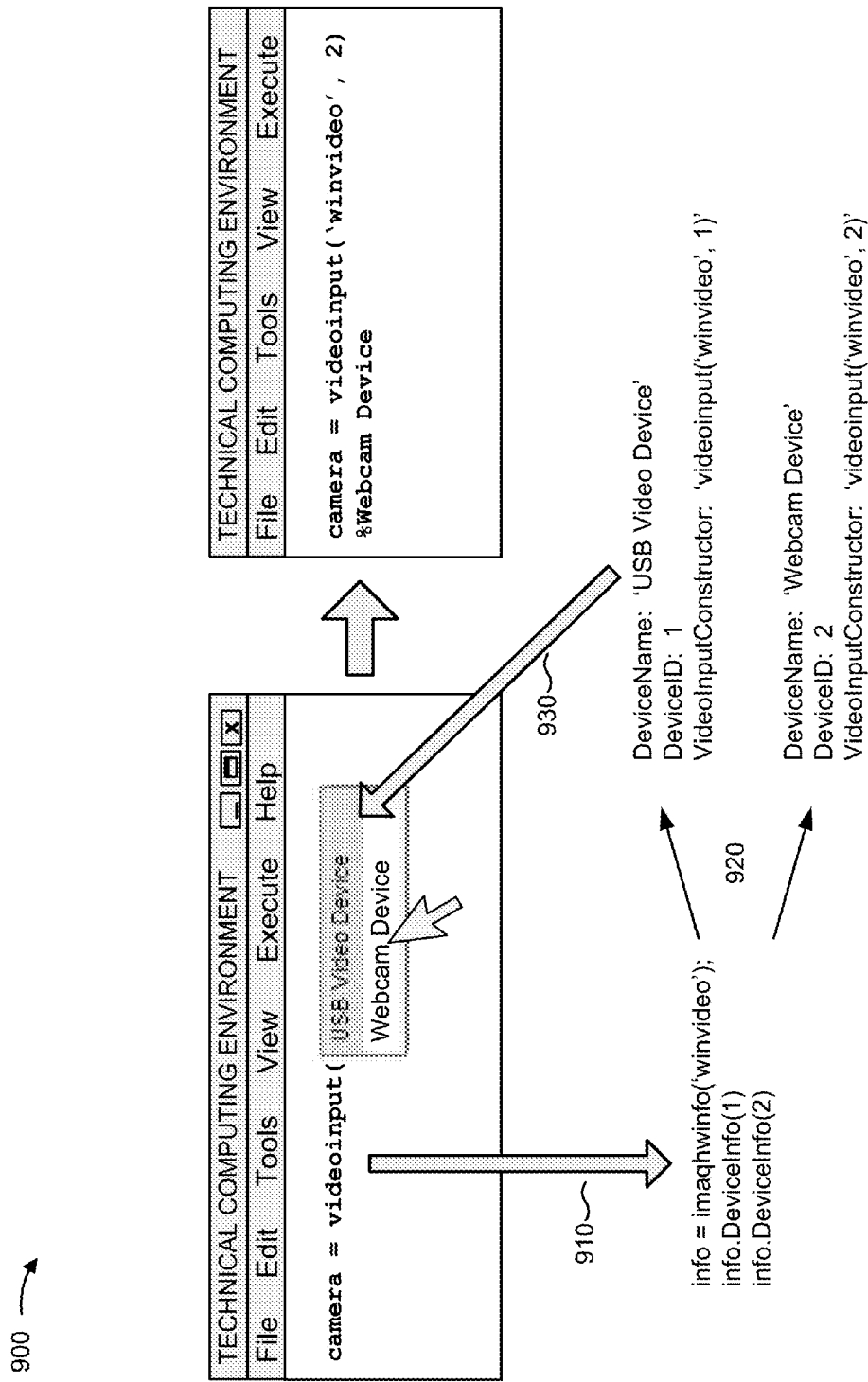
FIGS. 9A-9C are diagrams of yet another example implementation relating to the example process shown in FIG. 6.
Figure 9B:
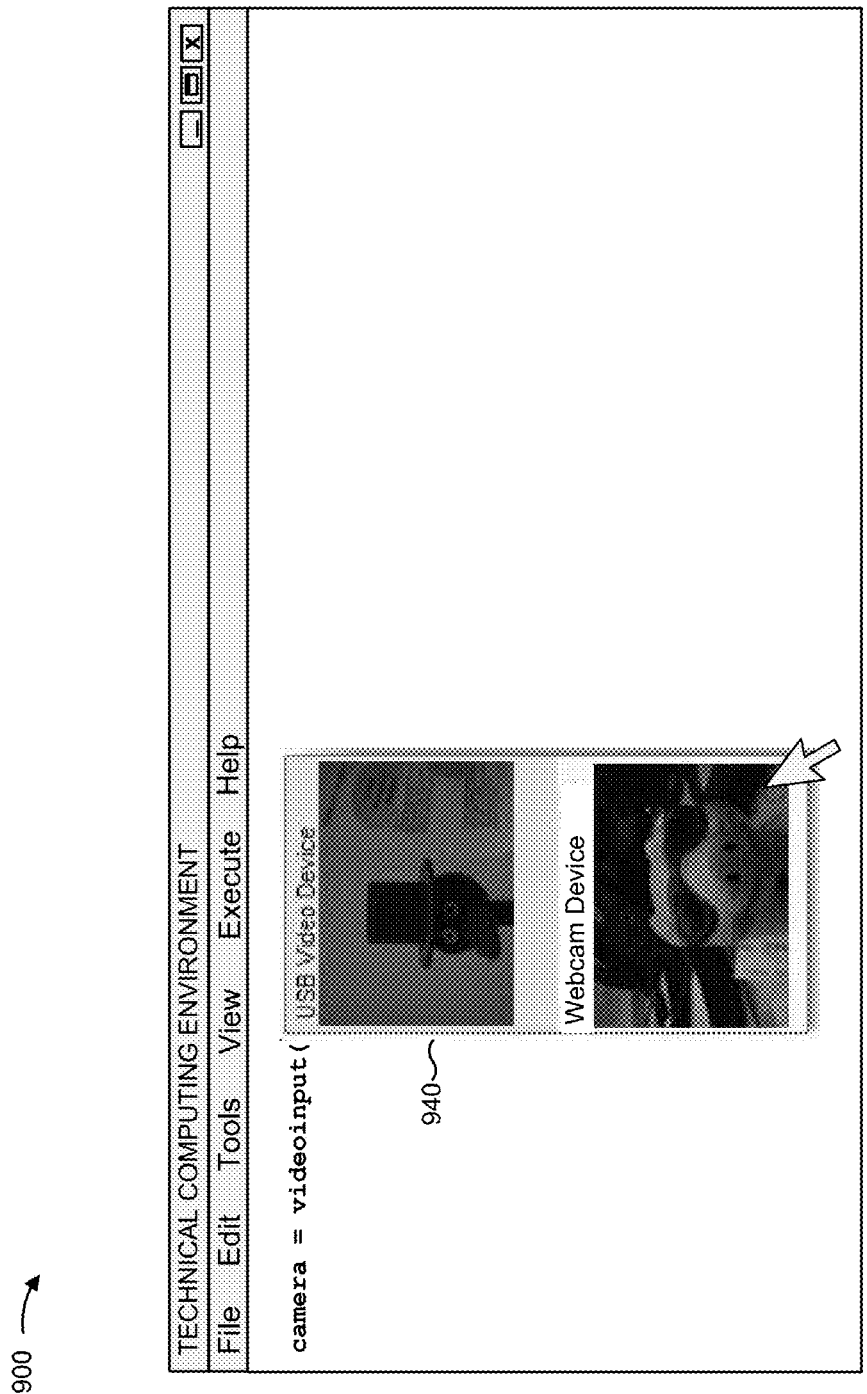
Figure 9C:
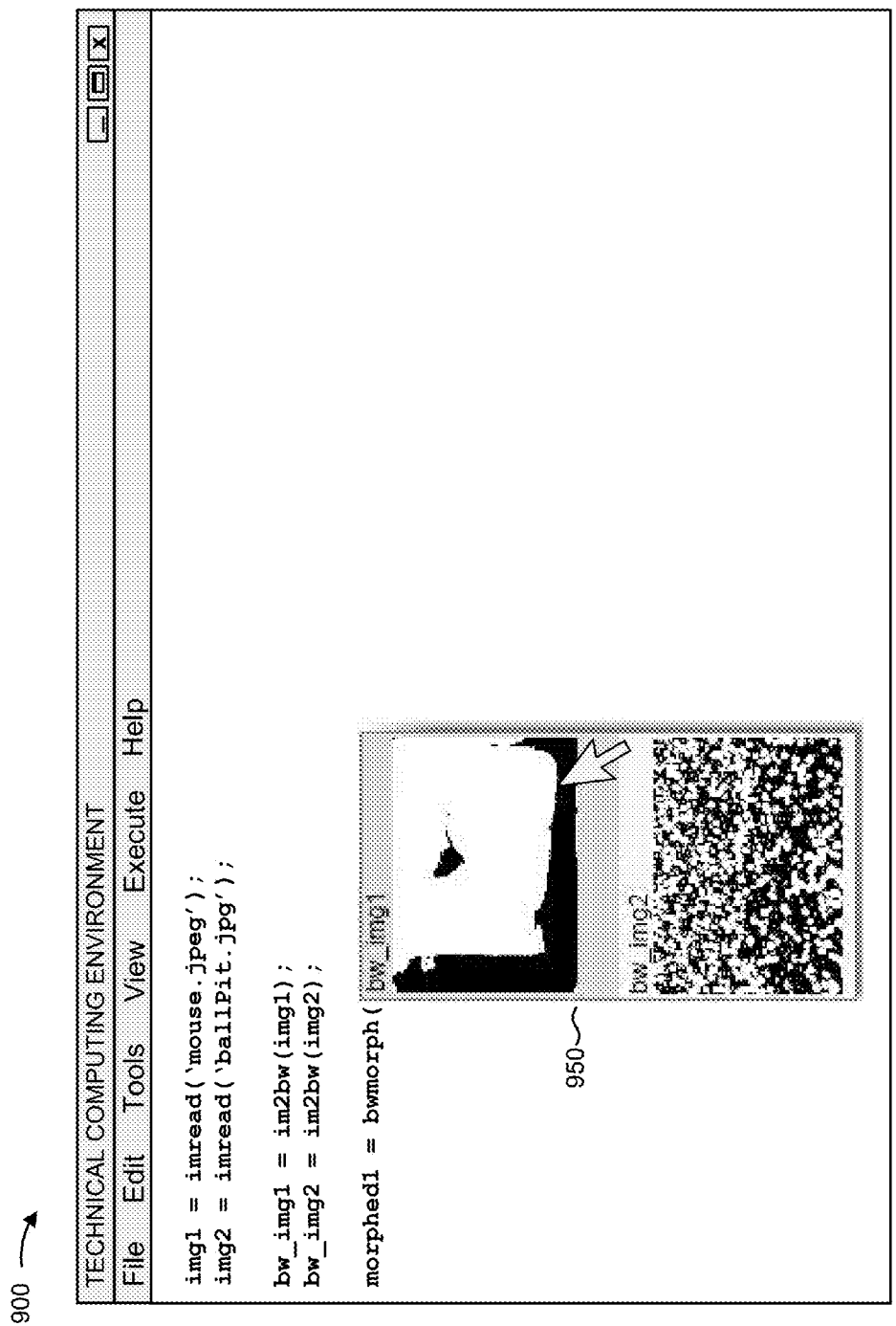

FIGS. 9A-9C are diagrams of yet another example implementation 900 relating to example process 600 shown in FIG. 6. FIGS. 9A-9C depict examples where client device 210 executes a program and/or performs a search to determine potential values to be represented on the Use Function GUI.

In FIG. 9A, assume that a user has input a function call (e.g., an object constructor), in program code, associated with a function that has been previously created by a developer using a function creator user interface. Assume that the function is named videoinput, and that the videoinput function, when executed, causes client device 210 to create an object that represents, and provides access to, a camera connected to client device 210. The user may specify values for input arguments of the videoinput function via a Use Function GUI. The values of the input arguments may specify the available cameras connected to client device 210. These values may be determined by running additional program code to determine which camera devices are connected to client device 210.

As shown by reference number 910, user input of the videoinput function may cause client device 210 to run a program to determine input arguments that represent camera devices connected to client device 210. For example, client device 210 may run program code, shown as:

info=imaqhwinfo('winvideo');
   info.DeviceInfo(1)
   info.DeviceInfo(2)

The above program code may be executed to determine the camera devices. As shown by reference number 920, client device 210 may determine, based on running the program, a name of each camera device, shown as "USB Video Device" and "Webcam Device." As shown by reference number 930, client device 210 may depict the names of the camera devices on the Use Function GUI.

Assume that the user selects "Webcam Device" as the input argument to the videoinput function, as shown. Based on the user selection, client device 210 may generate a function call site (or a portion of a function call site), for one or more input arguments, corresponding to the Webcam Device. For example, client device 210 may generate program code of ('winvideo', 2), as shown, as a portion of the function call site. In some implementations, client device 210 may generate a comment that assists the user in understanding the program code, such as "% Webcam Device", as shown FIG. 9B shows another example of information that may be represented on the Use Function GUI to assist a user in selecting a camera device associated with the function. In FIG. 9B, assume that client device 210 detects that the user has input the videoinput function. Further, assume that, based on the detection, client device 210 determines the camera devices connected to client device 210, and executes a program to output a live feed of information being captured by the camera devices. As shown by reference number 940, client device 210 may provide a representation of the live feed on the Use Function GUI. The representation of the live feed may assist a user in selecting a camera device, connected to client device 210, to be associated with the videoinput function.

FIG. 9C shows an example of representing information on the Use Function GUI based on a constraint and a search criterion. In FIG. 9C, assume that a developer has created a function named bwmorph, and has specified that an input argument for the bwmorph function must be a logical image (e.g., an image represented only by 1's and 0's, such as a black and white image), and must be a jpeg (or jpg) image. Further, assume that client device 210 detects that the user has input the bwmorph function. Based on the detection, client device 210 may perform a search of the user's workspace (or another search space) to determine potential input arguments (e.g., images) that match the developer's constraints and/or search criteria. As shown by reference number 950, client device 210 may provide a representation of logical jpeg/jpg images, found in the user's workspace, via the Use Function GUI. The representation of the images may assist a user in selecting an image to be processed using the bwmorph function.

The foregoing disclosure provides illustration and description, but is not intended to be exhaustive or to limit the implementations to the precise form disclosed. Modifications and variations are possible in light of the above disclosure or may be acquired from practice of the implementations.

As used herein, component is intended to be broadly construed as hardware, firmware, or a combination of hardware and software.

As used herein, program code is to be broadly interpreted to include text-based code that may not require further processing to execute (e.g., C++ code, Hardware Description Language (HDL) code, very-high-speed integrated circuits (VHSIC) HDL (VHDL) code, Verilog, Java, and/or other types of hardware or software based code that may be compiled and/or synthesized); binary code that may be executed (e.g., executable files that may directly be executed by an operating system, bitstream files that can be used to configure a field programmable gate array (FPGA), Java byte code, object files combined together with linker directives, source code, makefiles, etc.); text files that may be executed in conjunction with other executables (e.g., Python text files, a collection of dynamic-link library (DLL) files with text-based combining, configuration information that connects pre-compiled modules, an extensible markup language (XML) file describing module linkage, etc.); etc. In one example, program code may include different combinations of the above-identified classes (e.g., text-based code, binary code, text files, etc.). Additionally, or alternatively, program code may include code generated using a dynamically-typed programming language (e.g., the M language, a MATLAB® language, a MATLAB-compatible language, a MATLAB-like language, etc.) that can be used to express problems and/or solutions in mathematical notations. Additionally, or alternatively, program code may be of any type, such as a function, a script, an object, etc., and a portion of program code may include one or more characters, lines, etc. of the program code.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A method comprising:
   receiving an input in a programming environment, associated with a function that performs a functionality, to generate information that enables the functionality to be performed,
     the receiving the input being performed by a device;
   determining, based on receiving the input, an input argument associated with the function,
     the determining the input argument being performed by the device;

determining a program to be used to determine a set of potential values for the input argument,
the determining the program being performed by the device;
determining the set of potential values based on executing the program,
the determining the set of potential values being performed by the device;
providing, in the programming environment and based on the input, a user interface element that:
displays a representation of the input argument, and
provides one or more input mechanisms to receive a value corresponding to the input argument,
the input being received external to the user interface element, and
the providing the user interface element being performed by the device;
receiving a specification of a potential value of the set of potential values,
the receiving the specification of the potential value being performed by the device;
receiving, via the input mechanism, the value corresponding to the input argument, based on the specification of the potential value,
the receiving the value being performed by the device; and
generating the information that enables the functionality to be performed,
the information including first information identifying the function and second information that indicates a relationship between the value and the input argument,
the generating the information being performed by the device.

2. The method of claim 1, further comprising:
determining, based on information stored in a data structure, a constraint associated with the input argument;
verifying that the value satisfies the constraint, based on receiving the value and determining the constraint; and
providing the information that indicates the relationship based on verifying that the value satisfies the constraint.

3. The method of claim 1, further comprising:
generating a function call based on the value and the input argument; and
providing the generated function call.

4. The method of claim 1, further comprising:
determining that the input, associated with the function, has been input into a textual programming environment; and
receiving a data structure based on determining that the input has been input into the textual programming environment.

5. The method of claim 1, where the information, which enables the functionality to be performed, comprises source code or binary code.

6. The method of claim 1, further comprising:
searching information stored in a data structure to identify the function,
the data structure being populated based on information input via a function creator user interface; and
determining, based on searching the information stored in the data structure, the input argument associated with the function.

7. A non-transitory computer-readable medium storing instructions, the instructions comprising:
one or more instructions that, when executed by a processor, cause the processor to:
receive an input in a programming environment, associated with a function that performs a functionality, to generate information that enables the functionality to be performed;
determine one or more input arguments, associated with the function, based on receiving the input;
determine a program to be used to determine one or more potential values for the one or more input arguments;
determine the one or more potential values based on executing the program;
provide, in the programming environment and based on the input, a user interface element that:
displays a representation of the one or more input arguments, and
provides one or more input mechanisms to receive one or more values corresponding to the one or more input arguments,
the input being received external to the user interface element;
receive a specification of a potential value of the one or more potential values;
receive, via the one or more input mechanisms, one or more values corresponding to the one or more input arguments, based on the specification of the potential value; and
generate the information that enables the functionality to be performed,
the information including first information identifying the function and second information that indicates an association between the one or more values and the one or more input arguments.

8. The computer-readable medium of claim 7, where the one or more instructions, when executed by the processor, further cause the processor to:
verify that the one or more values satisfy one or more constraints associated with the one or more input arguments, based on receiving the one or more values; and
provide the second information that indicates the association based on verifying that the one or more values satisfy the one or more constraints.

9. The computer-readable medium of claim 7, where the one or more instructions, when executed by the processor, further cause the processor to:
generate a function call that associates the one or more values with the one or more input arguments, based on receiving the one or more values, and
provide the generated function call.

10. The computer-readable medium of claim 7, where the one or more instructions, when executed by the processor, further cause the processor to:
determine that a function identifier, that identifies the function, has been input via a user interface; and
receive the input based on determining that the function identifier has been input.

11. The computer-readable medium of claim 7, where the one or more instructions, when executed by the processor, further cause the processor to:
search a data structure to identify the function,
the data structure being populated based on information input via a function creator user interface; and
determine, based on searching the data structure, the one or more input arguments associated with the function.

12. The computer-readable medium of claim 7, where the first information identifies the function directly or indirectly.

13. The computer-readable medium of claim 7, where the one or more instructions, when executed by the processor, further cause the processor to:
   determine that the input, associated with the function, has been input into a textual programming environment; and
   receive a data structure based on determining that the input has been input into the textual programming environment.

14. The computer-readable medium of claim 7, where the information, which enables the functionality to be performed, comprises source code or binary code.

15. A device comprising:
   one or more processors to:
      receive a function identifier in a programming environment, associated with a function that performs a functionality, to generate information that enables the functionality to be performed;
      determine an input argument, associated with the function, based on the function identifier;
      determine a program to be used to determine a set of potential values for the input argument;
      determine the set of potential values based on executing the program;
      provide, in the programming environment and based on the function identifier, a user interface element that:
         displays a representation of the input argument, and
         provides an input mechanism to receive a value of the input argument,
            the function identifier being received external to the user interface element;
      receive a specification of a potential value of the set of potential values,
      receive, via the input mechanism, the value of the input argument based on the specification of the potential value; and
      generate the information that enables the functionality to be performed,
         the information including the function identifier and information that identifies an association between the value and the input argument, based on receiving the value of the input argument.

16. The device of claim 15, where:
   the one or more processors are further to:
      verify that the value satisfies a constraint, based on receiving the value, and
      provide the information that identifies the association based on verifying that the value satisfies the constraint.

17. The device of claim 16, where the one or more processors are further to at least one of:
   verify that the value is of a particular data type;
   verify that the value matches a potential value in a set of potential values; or
   verify a relationship between the value and another value associated with the input argument or another input argument.

18. The device of claim 15,
   where the information, that enables the functionality to be performed, comprises:
   source code, or
   binary code.

19. The device of claim 15, where the one or more processors are further to:
   search information stored in a data structure to identify the function,
      the data structure being populated based on information input via a function creator user interface; and
   determine, based on searching the information stored in the data structure, the input argument associated with the function.

20. The device of claim 15, where the one or more processors are further to:
   determine that the function identifier, associated with the function, has been input into a textual programming environment; and
   receive a data structure based on determining that the function identifier has been input into the textual programming environment.

21. The device of claim 15, where the one or more processors are further to:
   generate a function call based on the value and the input argument; and
   provide the function call.

* * * * *